(12) United States Patent
Jiang et al.

(10) Patent No.: US 10,750,467 B2
(45) Date of Patent: Aug. 18, 2020

(54) BIDIRECTIONAL LOCATION MEASUREMENT REPORT FEEDBACK

(71) Applicant: Intel IP Corporation, Santa Clara, CA (US)

(72) Inventors: Feng Jiang, Santa Clara, CA (US); Jonathan Segev, Tel Mond (IL); Po-Kai Huang, San Jose, CA (US); Qinghua Li, San Ramon, CA (US); Xiaogang Chen, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/234,249

(22) Filed: Dec. 27, 2018

(65) Prior Publication Data

US 2019/0132814 A1 May 2, 2019

Related U.S. Application Data

(60) Provisional application No. 62/617,488, filed on Jan. 15, 2018.

(51) Int. Cl.
*H04W 64/00* (2009.01)
*H04W 24/10* (2009.01)
*G01S 13/76* (2006.01)

(52) U.S. Cl.
CPC ........... *H04W 64/00* (2013.01); *G01S 13/765* (2013.01); *H04W 24/10* (2013.01)

(58) Field of Classification Search
CPC ...... H04W 64/00; H04W 24/10; G01S 13/765
See application file for complete search history.

(56) References Cited

U.S. PATENT DOCUMENTS

| | | | | |
|---|---|---|---|---|
| 2018/0292518 | A1* | 10/2018 | Chu | G01S 13/765 |
| 2018/0310133 | A1* | 10/2018 | Ramasamy | H04W 4/025 |
| 2019/0014491 | A1* | 1/2019 | Seok | H04W 12/06 |

* cited by examiner

*Primary Examiner* — Marcos L Torres
(74) *Attorney, Agent, or Firm* — Eversheds Sutherland (US) LLP

(57) ABSTRACT

This disclosure describes systems, methods, and devices related to a bidirectional location measurement report (LMR) feedback. A responding device may determine a first location measurement report (LMR) feedback type of an initiating device. The responding device may determine a second LMR feedback type of the responding device. The responding device may determine a common availability window, defined by a common start time and a common end time, for an exchange of a first LMR and a second LMR, wherein the common availability window is based on the first LMR feedback type and on the second LMR feedback type. The responding device may cause to send the first LMR to the initiating device during the common availability window. The responding device may identify the second LMR received from the initiating device during the common availability window.

20 Claims, 16 Drawing Sheets

US 10,750,467 B2

BIDIRECTIONAL LOCATION MEASUREMENT REPORT FEEDBACK

CROSS-REFERENCE

This application claims the benefit of U.S. Provisional Application 62/617,488, filed Jan. 15, 2018, the disclosure of which is incorporated herein by reference as if set forth in full.

TECHNICAL FIELD

This disclosure generally relates to systems, methods, and devices for wireless communications and, more particularly, bidirectional location measurement report (LMR) feedback.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
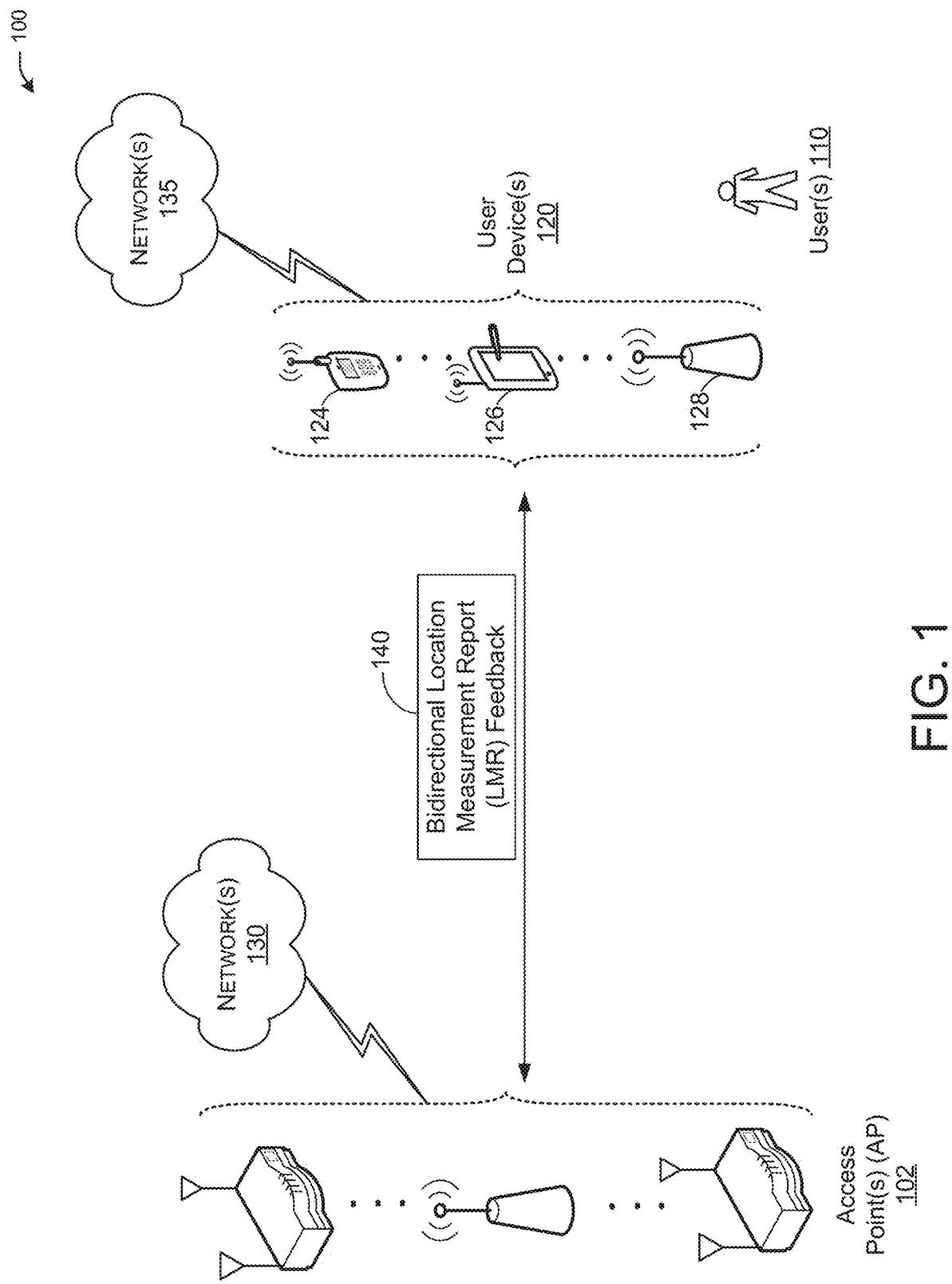
FIG. 1 depicts a diagram illustrating an example network environment of illustrative bidirectional location measurement report (LMR) feedback system, in accordance with one or more example embodiments of the present disclosure.

Example embodiments described herein provide certain systems, methods, and devices, for bidirectional location measurement report (LMR) feedback.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A LMR feedback sequence may be initiated between an initiating device and a responding device in order to establish a range estimation of the responding device. An initiating device (also referred to herein as an ISTA) is the device that initiates the LMR feedback sequence. A responding device (also referred to herein as an RSTA) is the device that responds to the initiation of the LMR feedback sequence.

The initiating device may be a station (STA) and the responding device may be an access point (AP). For example, a STA may determine to initiate an LMR feedback sequence to determine a range of the STA. Note, however, that the initiating device may be an AP and the responding device may be a STA. For example, an AP may determine to initiate an LMR feedback sequence to determine a location of the STA. In other words, the terms "initiating device" and "responding device" distinguish the two devices. An AP may occasionally determine its range to STA, for example, the AP may determine to track a location of the STA, in which case, as noted above, the AP may be an initiating device and the STA may be the responding device. In such a scenario, the AP may initiate an LMR sequence with a STA (or a plurality of STAs) to know the STA's range/location.

The LMR measurement sequence may include a channel sounding portion and an LMR availability window. The channel sounding portion may include the portion of the LMR measurement sequence that includes the exchange of an NDPA, an uplink (UL) NDP, and a downlink (DL) NDP between an initiating device and a responding device. The LMR measurement sequence may include an LMR availability window, which may be defined by a minimum time of arrival (TOA) ready time (e.g., the minimum TOA ready time is also referred to herein as MinToAReady) and by a maximum TOA available time (e.g., the maximum TOA available time is also referred to herein as MaxToAAvailable). The MinToAReady time indicates an earliest time that a LMR feedback report frame is ready for transmission to another device. For example, the LMR feedback report may not be determined prior to the MinToAReady time. The MaxToAAvailable time indicates a latest time that the LMR feedback frame can be sent to another device. For example, the LMR feedback report may be stored in a memory of the device (e.g., in a buffer) for only a certain amount of time before the resources of the memory have to be released (e.g., MaxToAAvailable is the latest time the LMR feedback report is stored in the memory).

The availability window information (e.g., the MinToAReady time and the MaxToAAvailable time) may be exchanged between initiating device and responding device during a negotiation phase between the initiating device and the responding device.

The current single-sided LMR feedback sequence in IEEE 802.11az may be used to support two types of LMR feedback, immediate or delayed. For immediate LMR feedback, the responding device may be able to send the LMR feedback frame corresponding to the channel sounding of the current measurement sequence and the LMR feedback frame may be sent within the current measurement sequence (e.g., within a SIFS of sending the DL NPD frame back to the initiating device). For delayed feedback, the responding device may send the LMR feedback frame corresponding to the channel sounding of the previous measurement sequence and the LMR feedback frame may be sent within the current measurement sequence.

According to some embodiments, for delayed LMR feedback, an availability window for LMR may be defined by MinToAReady and MaxToAAvailable. As noted above, this availability window information may be exchanged between the initiating device and the responding device during the negotiation phase. After completing the current round measurement sequence, the initiating device may need to come back to initiate a following round of measurement sequence to solicit the LMR feedback. A time interval, T, between the two rounds measurement sequence may be controlled by the initiating device (e.g., to meet the responding device's LMR availability window requirement).

In the current IEEE TGaz specification, support for two-sided LMR feedback between responding device and the initiating device, which enables the RSTA-to-ISTA (e.g., AP-to-STA) LMR feedback and the ISTA-to-RSTA (e.g., STA-to-AP) LMR feedback, was agreed to. However, the details of the design have not been completed. For the multi-user (MU) scenario, because there is a predefined recurring availability window for the measurement sequence, the AP and STA may use these availability windows to exchange the two-sided LMR. However, for the single-user (SU) scenario, there is no recurring availability window and the measurement sequence may usually (or always) be initialized by the initiating device. Hence, a responding rule needs to be defined for the initiating device to enable the efficient exchange of the two-sided LMR between the initiating device and the responding device.

Example embodiments of the present disclosure relate to systems, methods, and devices for bidirectional LMR feedback.

According to some embodiments, a bidirectional LMR feedback system may enable a two-sided LMR feedback between initiating and responding. The bidirectional LMR feedback system may determine that both the initiating device and the responding device provide immediate LMR feedback.

According to some embodiments, an initiating device may determine to initiate a bidirectional LMR feedback sequence. A current bidirectional LMR feedback sequence may be one of N bidirectional LMR feedback sequences, wherein N is a positive integer. The initiating device may send an NDPA frame to the responding device. The NDPA frame may announce to the responding device the beginning of a bidirectional LMR measurement sequence.

According to some embodiments, the initiating device may send an UL NDP frame a SIFS after the initiating device has sent the NDPA frame. The initiating device may determine a time of departure of the UL NDP frame (e.g., the time of departure of the UL NDP frame is also referred to herein as t1).

According to some embodiments, the responding device may receive the NDPA frame from the initiating device. The responding device may determine, in response to receipt of the NDPA frame, that an initiating device has begun a measurement sequence. The responding device may receive the UL NDP frame from the initiating device. The responding device may determine a time of arrival of the UL NDP frame (e.g., the time of arrival of the UL NDP frame 604 is also referred to herein as t2).

According to some embodiments, the responding device may send a DL NDP frame to the initiating device. The responding device may send the DL NDP frame to the initiating device after a SIFS after arrival of the UL NDP frame. The responding device may determine a time of departure of the DL NDP frame (e.g., the time of departure of the DL NDP frame is also referred to herein as t3).

According to some embodiments, the responding device may send an RSTA-to-ISTA LMR feedback frame for the round N measurement sequence to the initiating device. The responding device may send the RSTA-to-ISTA LMR feedback frame for the round N measurement sequence to the responding device after a SIFS after sending the DL NDP frame. The RSTA-to-ISTA LMR feedback frame for the round N measurement sequence may include the time of arrival of the UL NDP frame (e.g., t2) and the time of departure of the DL NDP frame (e.g., t3).

According to some embodiments, the initiating device may receive the DL NDP frame from the responding device. The initiating device may determine a time of arrival of the DL NDP frame (e.g., the time of arrival of the DL NDP frame is also referred to herein as t4). The initiating device may receive the RSTA-to-ISTA LMR feedback frame for the round N measurement sequence from the responding device. As noted above, the RSTA-to-ISTA LMR feedback frame for the round N measurement sequence may include the time of arrival of the UL NDP frame (e.g., t2) and the time of departure of the DL NDP frame (e.g., t3). Using the information in the LMR feedback frame for the round N measurement sequence (e.g., using t2 and t3) and the information determined by the initiating device (e.g., t1 and t4), the initiating device may determine a range to the responding device.

According to some embodiments, the initiating device may send an ISTA-to-RSTA LMR feedback frame for the round N measurement sequence to the responding device. The initiating device may send the ISTA-to-RSTA LMR feedback frame for the round N measurement sequence to the responding device after a SIFS after receiving the RSTA-to-ISTA LMR feedback frame for the round N measurement sequence. The ISTA-to-RSTA LMR feedback frame for the round N measurement sequence may include the time of departure of the UL NDP frame (e.g., t1) and the time of arrival of the DL NDP frame (e.g., t4).

According to some embodiments, the responding device may receive the ISTA-to-RSTA LMR feedback frame for the round N measurement sequence from the initiating device. As noted above, the ISTA-to-RSTA LMR feedback frame for the round N measurement sequence may include the time of departure of the UL NDP frame (e.g., t1) and the time of arrival of the DL NDP frame (e.g., t4). Using the information in the ISTA-to-RSTA LMR feedback frame for the round N measurement sequence (e.g., using t1 and t4) and the information determined by the responding device (e.g., t2 and t3), the responding device may determine a range to the initiating device.

According to some embodiments, the bidirectional LMR feedback system may determine that the initiating device may provide delayed LMR feedback and the responding device may provide immediate LMR feedback.

According to some embodiments, an initiating device may determine to initiate a bidirectional LMR feedback sequence. The current bidirectional LMR feedback sequence may be one of N bidirectional LMR feedback sequences, wherein N is a positive integer. The initiating device may send an NDPA frame to the responding device. The NDPA frame may announce to the responding device the beginning of a bidirectional LMR measurement sequence.

According to some embodiments, the initiating device may send an UL NDP frame a SIFS after the initiating device has sent the NDPA frame. The initiating device may determine a time of departure of the UL NDP frame (e.g., the time of departure of the UL NDP frame is also referred to herein as t1).

According to some embodiments, the responding device may receive the NDPA frame from the initiating device. The responding device may determine, in response to receipt of the NDPA frame, that an initiating device has begun an LMR measurement sequence.

According to some embodiments, the responding device may receive the UL NDP frame from the initiating device. The responding device may determine a time of arrival of the UL NDP frame (e.g., the time of arrival of the UL NDP frame is also referred to herein as t2).

According to some embodiments, the responding device may send a DL NDP frame to the initiating device. The responding device may send the DL NDP frame to the initiating device after a SIFS after arrival of the UL NDP frame. The responding device may determine a time of departure of the DL NDP frame (e.g., the time of departure of the DL NDP frame is also referred to herein as t3).

According to some embodiments, the responding device may send an RSTA-to-ISTA LMR feedback frame for the round N measurement sequence to the initiating device. The responding device may send the RSTA-to-ISTA LMR feedback frame for the round N measurement sequence to the responding device after a SIFS after sending the DL NDP frame. The RSTA-to-ISTA LMR feedback frame for the round N measurement sequence may include the time of arrival of the UL NDP frame (e.g., t2) and the time of departure of the DL NDP frame (e.g., t3).

According to some embodiments, the initiating device may receive the DL NDP frame from the responding device. The initiating device may determine a time of arrival of the DL NDP frame (e.g., the time of arrival of the DL NDP frame is also referred to herein as t4).

According to some embodiments, the initiating device may receive the RSTA-to-ISTA LMR feedback frame for the round N measurement sequence from the responding device. As noted above, the RSTA-to-ISTA LMR feedback frame for the round N measurement sequence may include the time of arrival of the UL NDP frame (e.g., t2) and the time of departure of the DL NDP frame (e.g., t3). Using the information in the LMR feedback frame for the round N measurement sequence (e.g., using t2 and t3) and the information determined by the initiating device (e.g., t1 and t4), the initiating device may determine a range to the responding device.

According to some embodiments, the initiating device may send an ISTA-to-RSTA LMR feedback frame for the round N−1 measurement sequence to the responding device. The initiating device may send the ISTA-to-RSTA LMR feedback frame for the round N−1 measurement sequence to the responding device after a SIFS after receiving the RSTA-to-ISTA LMR feedback frame for the round N measurement sequence. The ISTA-to-RSTA LMR feedback frame for the round N−1 measurement sequence may include the time of departure of the UL NDP frame (e.g., t1) and the time of arrival of the DL NDP frame (e.g., t4). Note that for N equal to 1, the ISTA-to-RSTA LMR feedback frame for the round N−1 measurement sequence may include dummy values for the ToA and ToD values (e.g., for t1 and t4).

According to some embodiments, the responding device may receive the ISTA-to-RSTA LMR feedback frame for the round N−1 measurement sequence from the initiating device. As noted above, the ISTA-to-RSTA LMR feedback frame for the round N−1 measurement sequence may include the time of departure of the UL NDP frame (e.g., t1) and the time of arrival of the DL NDP frame (e.g., t4). Using the information in the ISTA-to-RSTA LMR feedback frame for the round N−1 measurement sequence (e.g., using t1 and t4) and the information determined by the responding device (e.g., t2 and t3), the responding device may determine a range to the initiating device.

According to some embodiments, after the current round of measurement sequence (e.g., after round N) is completed, the initiating device may start a following round of measurement sequence (e.g., round N+1) to send the delayed LMR feedback (ISTA-to-RSTA for the round N measurement sequence) to the responding device. In other words, the initiating device may start the round N+1 of measurement sequence that includes the exchange of an NDPA frame, an UL NDP frame, a DL NDP frame, the RSTA-to-ISTA LMR feedback frame for the round N+1 measurement sequence, and the ISTA-to-RSTA LMR feedback frame for the round N measurement sequence. A time interval T between the round N and round N+1 measurement sequences may be controlled by the initiating device such that a value of T should be within the initiating device's time of arrival availability window (e.g., within MinToAReady and MaxToAAvailable).

According to some embodiments, the bidirectional LMR feedback system may determine that the initiating device may provide immediate LMR feedback and the responding device may provide delayed LMR feedback.

According to some embodiments, an initiating device may determine to initiate a bidirectional LMR feedback sequence. The current bidirectional LMR feedback sequence may be one of N bidirectional LMR feedback sequences, wherein N is a positive integer. The initiating device may send an NDPA frame to the responding device. The NDPA frame may announce to the responding device the beginning of a bidirectional LMR measurement sequence.

According to some embodiments, the initiating device may send an UL NDP frame a SIFS after the initiating device has sent the NDPA frame. The initiating device may determine a time of departure of the UL NDP frame (e.g., the time of departure of the UL NDP frame is also referred to herein as t1).

According to some embodiments, the responding device may receive the NDPA frame from the initiating device. The responding device may determine, in response to receipt of the NDPA frame, that an initiating device has begun an LMR measurement sequence.

According to some embodiments, the responding device may receive the UL NDP frame from the initiating device. The responding device may determine a time of arrival of the UL NDP frame (e.g., the time of arrival of the UL NDP frame is also referred to herein as t2).

According to some embodiments, the responding device may send a DL NDP frame to the initiating device. The responding device may send the DL NDP frame to the initiating device after a SIFS after arrival of the UL NDP frame. The responding device may determine a time of departure of the DL NDP frame (e.g., the time of departure of the DL NDP frame is also referred to herein as t3).

According to some embodiments, the responding device may send an RSTA-to-ISTA LMR feedback frame for the round N−1 measurement sequence to the initiating device. The responding device may send the RSTA-to-ISTA LMR feedback frame for the round N−1 measurement sequence to the responding device after a SIFS after sending the DL NDP frame. The RSTA-to-ISTA LMR feedback frame for the round N−1 measurement sequence may include the time of arrival of the UL NDP frame (e.g., t2) and the time of departure of the DL NDP frame (e.g., t3). Note that for N equal to 1, the RSTA-to-ISTA LMR feedback frame for the round N−1 measurement sequence may include dummy values for the ToA and ToD values (e.g., for t2 and t3).

According to some embodiments, the initiating device may receive the DL NDP frame from the responding device. The initiating device may determine a time of arrival of the DL NDP frame (e.g., the time of arrival of the DL NDP frame is also referred to herein as t4).

According to some embodiments, the initiating device may receive the RSTA-to-ISTA LMR feedback frame for the round N−1 measurement sequence from the responding device. As noted above, the RSTA-to-ISTA LMR feedback frame for the round N−1 measurement sequence may include the time of arrival of the UL NDP frame (e.g., t2) and the time of departure of the DL NDP frame (e.g., t3). Using the information in the LMR feedback frame for the round N−1 measurement sequence (e.g., using t2 and t3) and the information determined by the initiating device (e.g., t1 and t4), the initiating device may determine a range to the responding device.

According to some embodiments, the initiating device may send an ISTA-to-RSTA LMR feedback frame for the round N measurement sequence to the responding device. The initiating device may send the ISTA-to-RSTA LMR feedback frame for the round N measurement sequence to the responding device after a SIFS after receiving the RSTA-to-ISTA LMR feedback frame for the round N−1 measurement sequence. The ISTA-to-RSTA LMR feedback frame for the round N measurement sequence may include the time of departure of the UL NDP frame (e.g., t1) and the time of arrival of the DL NDP frame (e.g., t4).

According to some embodiments, the responding device may receive the ISTA-to-RSTA LMR feedback frame for the round N measurement sequence from the initiating device. As noted above, the ISTA-to-RSTA LMR feedback frame for the round N measurement sequence may include the time of departure of the UL NDP frame (e.g., t1) and the time of arrival of the DL NDP frame (e.g., t4). Using the information in the ISTA-to-RSTA LMR feedback frame for the round N measurement sequence (e.g., using t1 and t4) and the information determined by the responding device (e.g., t2 and t3), the responding device may determine a range to the initiating device.

In one embodiment, after the current round of measurement sequence (e.g., after round N) is completed, the initiating device may start a following round of measurement sequence (e.g., round N+1) to receive the delayed LMR feedback (RSTA-to-ISTA for the round N measurement sequence) from the responding device. In other words, the initiating device may start the round N+1 of measurement sequence that includes the exchange of an NDPA frame, an UL NDP frame, a DL NDP frame, the RSTA-to-ISTA LMR feedback frame for the round N measurement sequence, and the ISTA-to-RSTA LMR feedback frame for the round N+1 measurement sequence. A time interval T between the round N and round N+1 measurement sequences may be controlled by the initiating device such that a value of T should be within the responding device's time of arrival availability window (e.g., within MinToAReady and MaxToAAvailable).

According to some embodiments, the bidirectional LMR feedback system may determine that both the initiating device and the responding device may provide delayed LMR feedback.

According to some embodiments, an initiating device may determine to initiate a bidirectional LMR feedback sequence. The current bidirectional LMR feedback sequence may be one of N bidirectional LMR feedback sequences, wherein N is a positive integer. The initiating device may send an NDPA frame to the responding device. The NDPA frame may announce to the responding device the beginning of a bidirectional LMR measurement sequence.

According to some embodiments, the initiating device may send an UL NDP frame a SIFS after the initiating device has sent the NDPA frame. In other words, the initiating device may send the NDPA frame to the responding device and, after the duration of a SIFS, the initiating device may send the UL NDP frame to the responding device. The initiating device may determine a time of departure of the UL NDP frame (e.g., the time of departure of the UL NDP frame is also referred to herein as t1).

According to some embodiments, the responding device may receive the NDPA frame from the initiating device. The responding device may determine, in response to receipt of the NDPA frame, that an initiating device has begun an LMR measurement sequence.

According to some embodiments, the responding device may receive the UL NDP frame from the initiating device. The responding device may determine a time of arrival of the UL NDP frame (e.g., the time of arrival of the UL NDP frame is also referred to herein as t2).

According to some embodiments, the responding device may send a DL NDP frame to the initiating device. The responding device may send the DL NDP frame to the initiating device after a SIFS after arrival of the UL NDP frame. The responding device may determine a time of departure of the DL NDP frame (e.g., the time of departure of the DL NDP frame is also referred to herein as t3).

According to some embodiments, the responding device may send an RSTA-to-ISTA LMR feedback frame for the round N−1 measurement sequence to the initiating device. The responding device may send the RSTA-to-ISTA LMR feedback frame for the round N−1 measurement sequence to the initiating device after a SIFS after sending the DL NDP frame. The RSTA-to-ISTA LMR feedback frame for the round N−1 measurement sequence may include the time of arrival of the UL NDP frame (e.g., t2) and the time of departure of the DL NDP frame (e.g., t3). Note that for N equal to 1, the RSTA-to-ISTA LMR feedback frame for the round N−1 measurement sequence may include dummy values for the ToA and ToD values (e.g., for t2 and t3).

According to some embodiments, the initiating device may receive the DL NDP frame from the responding device. The initiating device may determine a time of arrival of the DL NDP frame (e.g., the time of arrival of the DL NDP frame is also referred to herein as t4).

According to some embodiments, the initiating device may receive the RSTA-to-ISTA LMR feedback frame for the round N−1 measurement sequence from the responding device. As noted above, the RSTA-to-ISTA LMR feedback frame for the round N−1 measurement sequence may include the time of arrival of the UL NDP frame (e.g., t2) and the time of departure of the DL NDP frame (e.g., t3). Using the information in the LMR feedback frame for the round N−1 measurement sequence (e.g., using t2 and t3) and the information determined by the initiating device (e.g., t1 and t4), the initiating device may determine a range to the responding device.

According to some embodiments, the initiating device may send an ISTA-to-RSTA LMR feedback frame for the round N−1 measurement sequence to the responding device. The initiating device may send the ISTA-to-RSTA LMR feedback frame for the round N−1 measurement sequence to the responding device after a SIFS after receiving the RSTA-to-ISTA LMR feedback frame for the round N−1 measurement sequence. The ISTA-to-RSTA LMR feedback frame for the round N−1 measurement sequence may include the time of departure of the UL NDP frame (e.g., t1) and the time of arrival of the DL NDP frame (e.g., t4).

According to some embodiments, the responding device may receive the ISTA-to-RSTA LMR feedback frame for the round N−1 measurement sequence from the initiating device. As noted above, the ISTA-to-RSTA LMR feedback frame for the round N−1 measurement sequence may include the time of departure of the UL NDP frame (e.g., t1) and the time of arrival of the DL NDP frame (e.g., t4). Using the information in the ISTA-to-RSTA LMR feedback frame for the round N−1 measurement sequence (e.g., using t1 and t4) and the information determined by the responding device (e.g., t2 and t3), the responding device may determine a range to the initiating device.

According to some embodiments, after the current round of measurement sequence (e.g., after round N) is completed, the initiating device may start a following round of measurement sequence (e.g., round N+1) to receive/transmit the delayed LMR feedback (RSTA-to-ISTA LMR for the round N−1 measurement sequence and ISTA-to-RSTA for the round N−1 measurement sequence) from/to the responding device. In other words, the initiating device may start the round N+1 of measurement sequence that includes the exchange of an NDPA frame, an UL NDP frame, a DL NDP frame, the RSTA-to-ISTA LMR feedback frame for the round N measurement sequence, and the ISTA-to-RSTA LMR feedback frame for the round N measurement sequence. A time interval T between the round N and round N+1 measurement sequences may be controlled by the initiating device such that a value of T should be within both the responding device's time of arrival availability window and the initiating device's time of arrival availability window (e.g., within MinToAReady and MaxToAAvailable), as discussed in greater detail below.

According to some embodiments, the initiating device and the responding device may exchange the ToA availability information [MinToAReady, MaxToAAvaialble] during the negotiation phase, and the initiating device may use a fine timing measurement (FTM) request frame to send its ToA availability window information to the responding device.

According to some embodiments, based on the initiating device's availability window and on the responding device's own availability window, the responding device may determine a negotiated availability window. The responding device may use an FTM response frame to send its negotiated ToA availability window information to the initiating device. To achieve an efficient exchange of the two-sided LMR feedback frames, the responding device should select the negotiated availability window such that both the initiating device's and the responding device's ToA/ToD are available within this window.

According to some embodiments, a responding device's LMR availability window occurs before an initiating device's LMR availability window without overlapping. The responding device's LMR availability window may be defined by a minimum time of arrival (TOA) ready time (e.g., the minimum TOA ready time is also referred to herein as MinToAReady) and by a maximum TOA available time (e.g., the maximum TOA available time is also referred to herein as MaxToAAvailable).

According to some embodiments, the responding device may determine that the negotiated LMR availability window will be equal to the initiating device's availability window. In other words, the original values of the MinToAReady time and of the MaxToAAvailable time for the responding device may be modified in order to align with the values of the MinToAReady time and of the MaxToAAvailable time of the initiating device.

According to some embodiments, a responding device's LMR availability window occurs before an initiating device's LMR availability window, but the respective windows overlap. The responding device may determine that the negotiated LMR availability window will be equal to the initiating device's MinToAReady time and the responding device's MaxToAAvailable time. In other words, the original value of the MinToAReady time of the responding device and the original value of the MaxToAAvailable time of the initiating device may be modified in order to align with the values of the negotiated LMR availability window.

According to some embodiments, the responding device may determine whether a duration of the negotiated LMR availability meets and/or exceeds a minimum threshold. For example, the minimum threshold may be large enough to accommodate one or more frames. If the negotiated LMR feedback window falls below the minimum threshold, the end time of the negotiated LMR availability window may be extended in order to meet or exceed the minimum threshold.

According to some embodiments, an initiating device's LMR availability window occurs before a responding device's LMR availability window, but the respective windows overlap. The responding device may determine that the negotiated LMR availability window will be equal to the responding device's MinToAReady time and the initiating device's MaxToAAvailable time. In other words, the original value of the MinToAReady time of the initiating device and the original value of the MaxToAAvailable time of the responding device may be modified in order to align with the values of the negotiated LMR availability window.

According to some embodiments, the responding device may determine whether a duration of the negotiated LMR availability meets and/or exceeds a minimum threshold. For example, the minimum threshold may be large enough to accommodate one or more frames. If the negotiated LMR feedback window falls below the minimum threshold, the end time of the negotiated LMR availability window may be extended in order to meet or exceed the minimum threshold.

According to some embodiments, an initiating device's LMR availability window occurs before a responding device's LMR availability window without overlapping. The responding device may determine that the negotiated LMR availability window will be equal to the responding device's MinToAReady time and the responding device's MaxToAAvailable time (e.g., equal to the responding device's LMR availability window). In other words, the original value of the MinToAReady time of the initiating device and the original value of the MaxToAAvailable time of the initiating device may be modified in order to align with the values of the negotiated LMR availability window.

According to some embodiments, after the initiating device receives the FTM response frame from the responding device, if the initiating device agrees with the responding device's negotiated availability window, the initiating device should start the following round measurement sequence according to the negotiated availability window. If the initiating device disagrees with the negotiated availability window, then the initiating device may start a new negotiation phase and may send a new FTM request to the responding device, which may include new availability window information.

According to some embodiments, the responding device or initiating device may have to extend the MaxtoAAvailable boundary to accommodate the negotiated availability window, and this will increase the length of period for buffering the ToA information, which may cause additional burden to the initiating device or responding device.

According to some embodiments, the initiating device and responding device may be requested to support the same feedback types in the RSTA-to-ISTA LMR and ISTA-to-RSTA LMR. For example, to limit the number of different measurement sequences and simplify the design, if either the initiating device or the responding device provides delayed LMR feedback, then both the initiating device and the responding device should provide the delayed LMR feedback. For the single-sided LMR feedback, the LMR feedback type field in the FTM response frame may indicate the LMR type for the RSTA-to-ISTA LMR and for the two-sided LMR feedback, the LMR feedback type field in the FTM response frame may indicate the LMR type for both the RSTA-to-ISTA feedback and the ISTA-to-RSTA feedback.

According to some embodiments, when both of the RSTA-to-ISTA feedback and the ISTA-to-RSTA feedback are immediate, the LMR type in FTM response will be immediate. Otherwise, the LMR type in the FTM response may be delayed and the negotiated availability window in the FTM response frame may be used by the initiating device to initiate a following round measurement sequence for the delayed two-sided LMR exchange. Under this responding rule, the initiating device and the responding device only need to support two cases.

According to some embodiments, both the initiating device and the responding device provide immediate LMR feedback. In the current round measurement sequence, the initiating device and the responding device will exchange the LMR feedback for the uplink and downlink NDP (e.g., an NDPA frame, an UL NDP frame, and a DL NDP frame) in the current round channel sounding.

According to some embodiments, at least one of the initiating device or the responding device provides delayed LMR feedback. Even though the responding device can provide the immediate LMR feedback (t2 and t3) to the initiating device, the initiating device cannot obtain the range estimation immediately (e.g., because the initiating device's range estimation calculation also needs the initiating device's LMR information, t1 and t4). In other words, before the initiating device's LMR is ready, the initiating device cannot obtain the range estimation. Therefore, when the responding device can send immediate feedback and the initiating device can send delayed feedback, forcing the responding device to send the delayed LMR feedback will not impact the latency of the initiating device's or responding device's range estimations.

According to some embodiments, the negotiated availability window in the responding device's FTM response frame can be determined for the following three cases. First, the responding device provides immediate LMR feedback and the initiating device provides delayed LMR feedback. In such a scenario, the negotiated availability window should align with the initiating device's availability window. Second, the initiating device provides immediate LMR feedback and the responding device provides delayed LMR feedback. In such a scenario, the negotiated availability window should align with the responding device's availability window. Third, both the initiating device and the responding device can provide delayed LMR feedback.

According to some embodiments, the responding rules described above can also be applied to the MU scenario, and for MU scenario, in each target wake time (TWT) window, the initiating device and the responding device can exchange the two-sided LMR according to the proposed responding rules. For example, if either the initiating device or the responding device only supports delayed LMR feedback, then both of the initiating device or the responding device should support the delayed LMR. The immediate two-sided LMR feedback is supported only when both of the initiating device and the responding device can support the immediate LMR feedback.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a diagram illustrating an example network environment, in accordance with one or more example embodiments of the present disclosure. Wireless network 100 may include one or more user devices 120 and one or more APs 102, which may communicate in accordance with IEEE 802.11 communication standards. The user device(s) 120 may be mobile devices that are non-stationary (e.g., not having fixed locations) or may be stationary devices.

Figure 13:
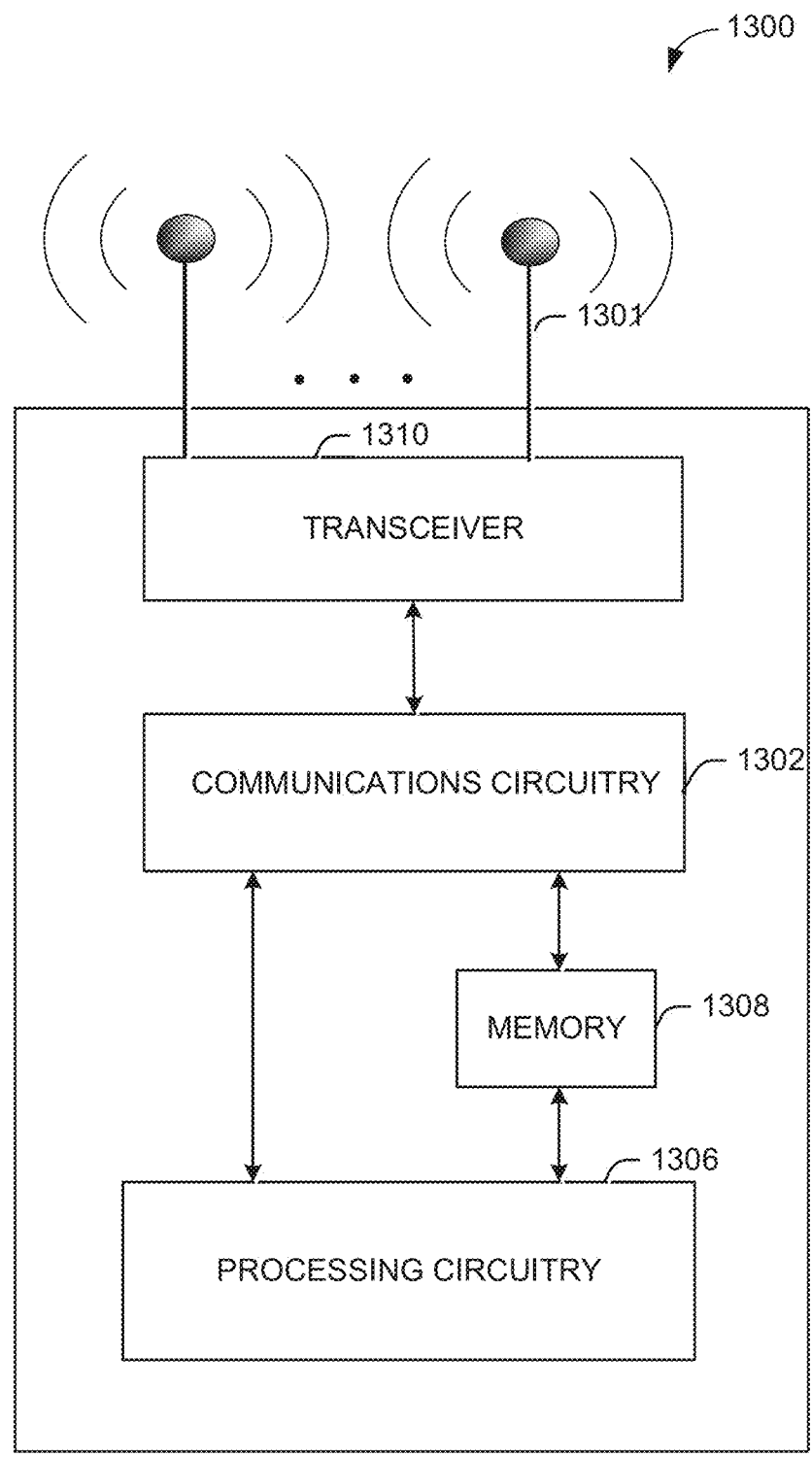
FIG. 13 depicts a functional diagram of an example communication station, in accordance with one or more example embodiments of the present disclosure.
Figure 14:
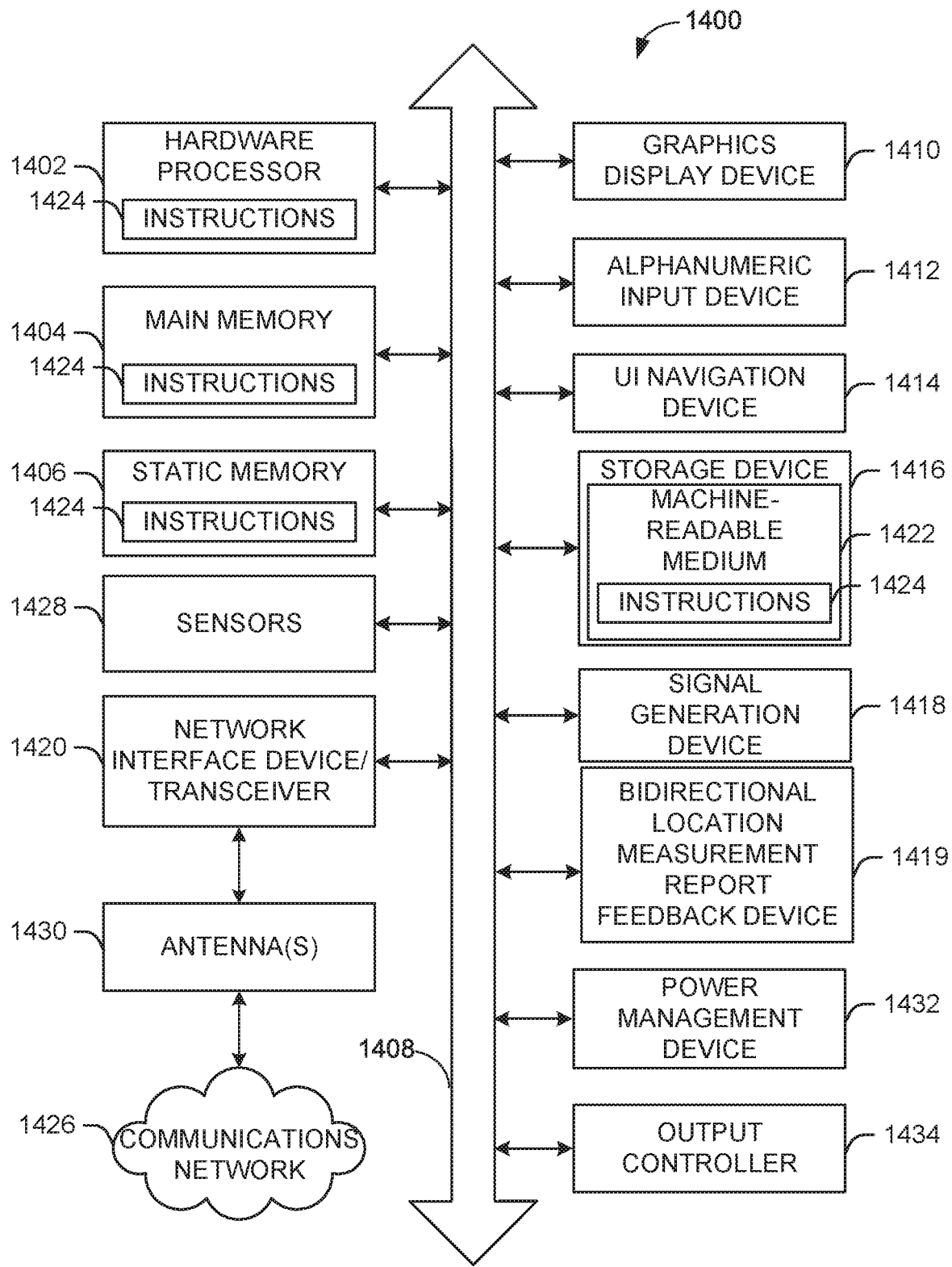
FIG. 14 depicts a block diagram of an example machine upon which any of one or more techniques (e.g., methods) may be performed, in accordance with one or more example embodiments of the present disclosure.

In some embodiments, the user devices 120, and the AP(s) 102 may include one or more computer systems similar to that of the functional diagram of FIG. 13 and/or the example machine/system of FIG. 14.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc., may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 (e.g., user devices 124, 126, 128) and/or AP(s) 102 may also include mesh stations in, for example, a mesh network, in accordance with one or more IEEE 802.11 standards and/or 3GPP standards.

Any of the user device(s) 120 (e.g., user devices 124, 126, 128) and/or AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and/or AP(s) 102 may include one or more communications antennas. The one or more communications antennas may be any suitable type of antennas corresponding to the communications protocols used by the user device(s) 120 (e.g., user devices 124, 126 and 128) and/or AP(s) 102. Some non-limiting examples of suitable communications antennas include Wi-Fi antennas, IEEE 802.11 family of standards compatible antennas, directional antennas, non-directional antennas, dipole antennas, folded dipole antennas, patch antennas, multiple-input, multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 (e.g., user devices 124, 126, 128) and/or AP(s) 102.

Any of the user device(s) 120 (e.g., user devices 124, 126, 128) and/or AP(s) 102 may be configured to perform directional transmission and/or directional reception in conjunction with wirelessly communicating in a wireless network. Any of the user device(s) 120 (e.g., user devices 124, 126, 128) and/or AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128) and/or AP(s) 102 may be configured to perform any given directional transmission towards one or more defined transmit sectors. Any of the user device(s) 120 (e.g., user devices 124, 126, 128) and/or AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128) and/or AP(s) 102 may include any suitable radio and/or transceiver for transmitting and/or receiving radio frequency (RF) signals in the bandwidth and/or channels corresponding to the communications protocols utilized by any of the user device(s) 120 and/or AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the IEEE 802.11 standards.

Some embodiments may be used in conjunction with devices and/or networks operating in accordance with existing Wireless Fidelity (Wi-Fi) Alliance (WFA) Specifications, including Wi-Fi Neighbor Awareness Networking (NAN) Technical Specification (e.g., NAN and NAN2) and/or future versions and/or derivatives thereof, devices and/or networks operating in accordance with existing WFA Peer-to-Peer (P2P) specifications and/or future versions and/or derivatives thereof, devices and/or networks operating in accordance with existing Wireless-Gigabit-Alliance (WGA) specifications (Wireless Gigabit Alliance, Inc. WiGig MAC and PHY Specification) and/or future versions and/or derivatives thereof, devices and/or networks operating in accordance with existing IEEE 802.11 standards and/or amendments (e.g., 802.11b, 802.11g, 802.11n, 802.11ac, 802.11ax, 802.11ad, 802.11ay, 802.11az, etc.).

In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, a user device 120 may be in communication with one or more APs 102.

For example, AP 102 may communicate with a user device 120 by exchanging frames during a bidirectional LMR feedback sequence 140.

It is understood that the above descriptions are for purposes of illustration and are not meant to be limiting.

Figure 2:
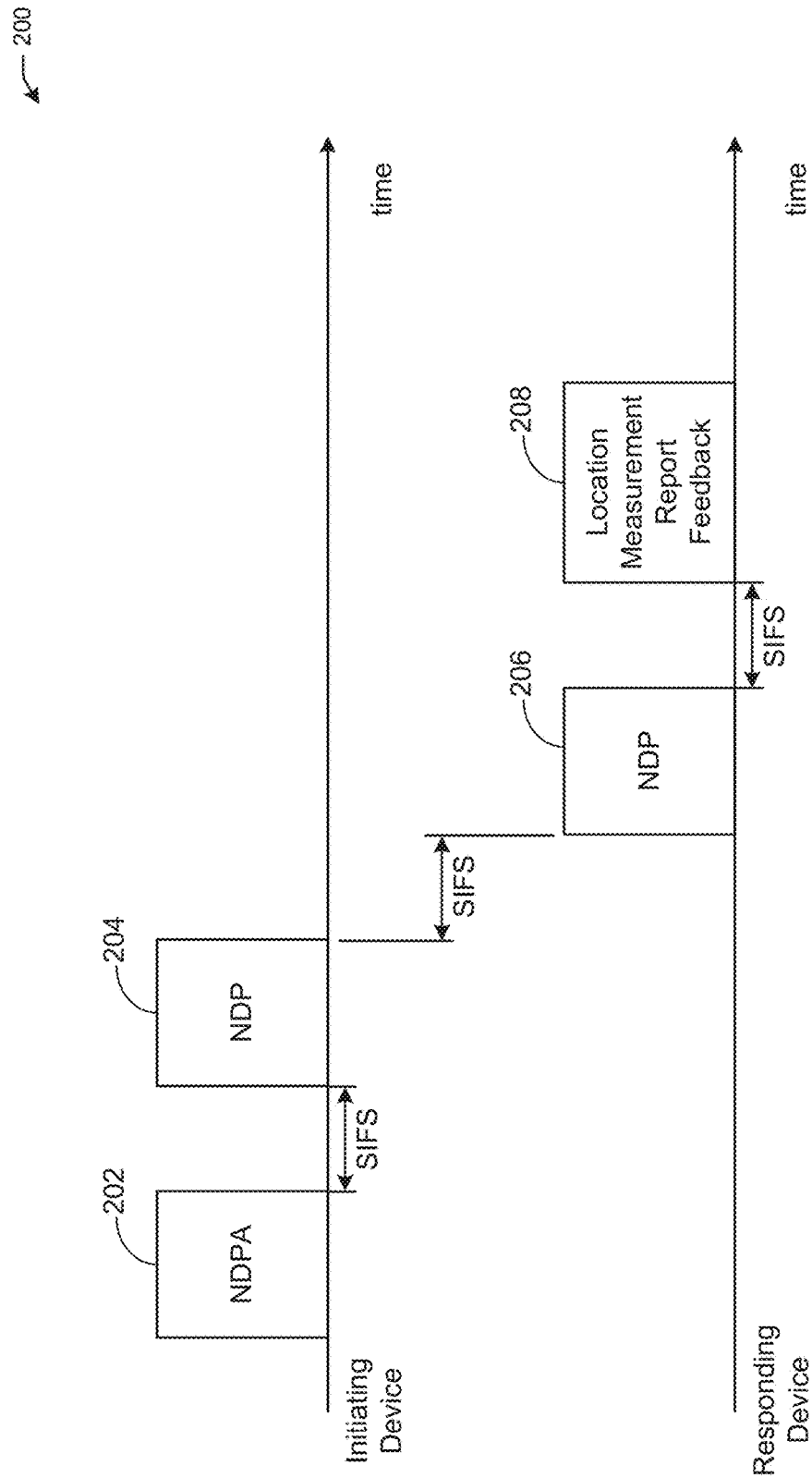
FIG. 2 depicts an illustrative schematic diagram for a single-sided LMR feedback sequence.

FIG. 2 depicts an illustrative schematic diagram for a single-sided LMR feedback sequence 200.

Referring to FIG. 2, there is shown a single-sided LMR feedback sequence 200 between an initiating device and a responding device. An initiating device (also referred to herein as an ISTA) is the device that initiates the LMR feedback sequence. In other words, the initiating device is the device that, during an LMR measurement sequence, sends a null data packet announce (NDPA) frame and an uplink (UL) null data packet (NDP) to the responding device. The initiating device may be any of the user devices 120 (e.g., user devices 124, 126, 128) and/or AP(s) 102 as shown in FIG. 1.

A responding device (also referred to herein as an RSTA) is the device that responds to the initiation of the LMR feedback sequence. In other words, the responding device is the device that receives the NDPA frame and the UL NDP frame from the initiating device and sends a downlink (DL) NDP and a LMR feedback frame to the initiating device. The responding device may be any of the user devices 120 (e.g., user devices 124, 126, 128) and/or AP(s) 102 as shown in FIG. 1.

According to some embodiments, the initiating device may be a STA and the responding device may be an AP. For example, a STA may determine to initiate an LMR feedback sequence, for example in order to determine a location of the STA. Note, however, that the initiating device may be an AP and the responding device may be a STA. For example, an AP may determine to initiate an LMR feedback sequence, for example in order to determine a location of the STA. In other words, the terms "initiating device" and "responding device" distinguish the two devices. While an AP may occasionally determine its own location, the AP may determine to track a location of the STA, in which case, as noted above, the AP may be an initiating device and the STA may be the responding device. In such a scenario, the AP may initiate an LMR sequence with a STA (or a plurality of STAs) to know its location.

According to some embodiments, an initiating device may determine to initiate an LMR feedback sequence. The initiating device may send an NDPA frame 202 to the responding device. The NDPA frame 202 may announce to the responding device the beginning of a LMR measurement sequence. The initiating device may send an UL NDP frame 204 a short interframe space (SIFS) after the initiating device has sent the NDPA frame 202. In other words, the initiating device may send the NDPA frame 202 to the responding device and, after the duration of a SIFS, the initiating device may send the UL NDP frame 204 to the responding device. As discussed in greater detail below, the initiating device may determine a time of departure of the UL NDP frame 204 (e.g., the time of departure of the UL NDP frame 204 is also referred to herein as t1).

According to some embodiments, the responding device may receive the NDPA frame 202 from the initiating device. The responding device may determine, in response to receipt of the NDPA frame 202, that an initiating device has begun an LMR measurement sequence. The responding device may receive the UL NDP frame 204 from the initiating device. As discussed in greater detail below, the responding device may determine a time of arrival of the UL NDP frame 204 (e.g., the time of arrival of the UL NDP frame 204 is also referred to herein as t2).

According to some embodiments, the responding device may send a DL NDP frame 206 to the initiating device. The responding device may send the DL NDP frame 206 to the initiating device after a SIFS after arrival of the UL NDP frame 204. In other words, the responding device may receive the UL NDP frame 204 from the initiating device and, after the duration of a SIFS, the responding device may send the DL NDP frame 206 to the initiating device. As discussed in greater detail below, the responding device may determine a time of departure of the DL NDP frame 206 (e.g., the time of departure of the DL NDP frame 206 is also referred to herein as t3).

According to some embodiments, the responding device may send an LMR feedback frame 208 to the initiating device. The responding device may send the LMR feedback frame 208 to the initiating device after a SIFS after sending the DL NDP frame 206. In other words, the responding device may send the DL NDP frame 206 to the initiating device and, after the duration of a SIFS, the responding device may send the LMR feedback frame 208 to the initiating device. The LMR feedback frame 208 may include the time of arrival of the UL NDP frame 204 (e.g., t2) and the time of departure of the DL NDP frame 206 (e.g., t3).

According to some embodiments, the initiating device may receive the DL NDP frame 206 from the responding device. As discussed in greater detail below, the initiating device may determine a time of arrival of the DL NDP frame 206 (e.g., the time of arrival of the DL NDP frame 206 is also referred to herein as t4). The initiating device may receive the LMR feedback frame 208 from the responding device. As noted above, the LMR feedback frame 208 may include the time of arrival of the UL NDP frame 204 (e.g., t2) and the time of departure of the DL NDP frame 206 (e.g., t3). Using the information in the LMR feedback frame 208 (e.g., using t2 and t3) and the information determined by the initiating device (e.g., t1 and t4), the initiating device may determine a location of the responding device and/or a location of the initiating device.

It is understood that the above descriptions are for purposes of illustration and are not meant to be limiting.

Figure 3:
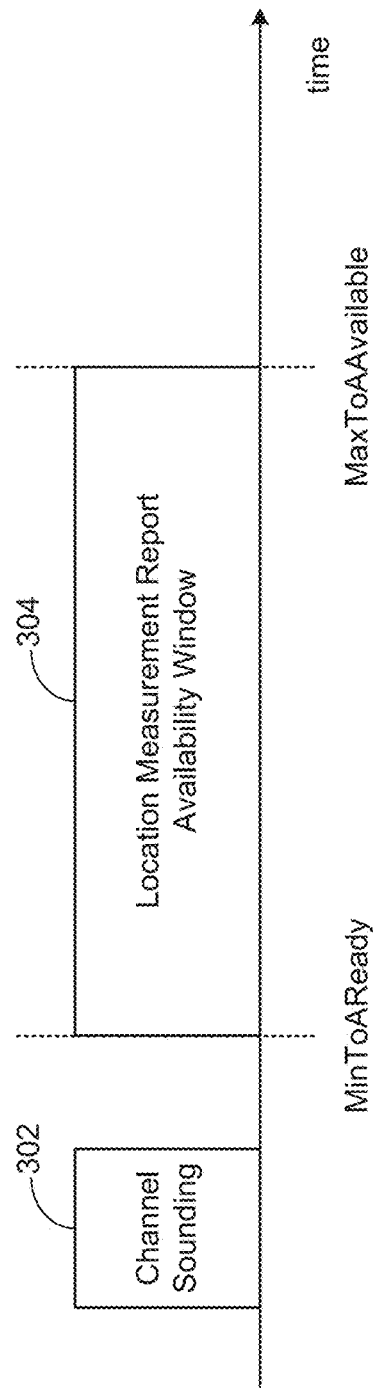
FIG. 3 depicts an illustrative schematic diagram of a channel sounding and an availability window for LMR.

FIG. 3 depicts an illustrative schematic diagram 300 of a channel sounding and an availability window for LMR.

Referring to FIG. 3, there is shown a schematic diagram 300 of two portions of a LMR measurement sequence. The LMR measurement sequence illustrated in FIG. 3 includes a channel sounding portion 302 and an LMR availability window 304. The channel sounding portion 302 may include the portion of the LMR measurement sequence that includes the exchange of an NDPA, an UL NDP, and a DL NDP between an initiating device and a responding device. For example, the channel sounding portion 302 may include the exchange of NDPA frame 202, UL NDP frame 204, and DL NDP frame 206 of FIG. 2.

According to some embodiments, the LMR measurement sequence may include LMR availability window 304. The LMR availability window 304 may be defined by a minimum time of arrival (TOA) ready time (e.g., the minimum TOA ready time is also referred to herein as MinToAReady) and by a maximum TOA available time (e.g., the maximum TOA available time is also referred to herein as MaxToAAvailable). Note that MinToAReady occurs before MaxToAAvailable. In other words, the LMR availability window 304 has a start time that is MinToAReady and an end time that is MaxToAAvailable. The MinToAReady time indicates an earliest time that a LMR feedback report frame is ready for transmission to another device. For example, the LMR feedback report may not be determined prior to the MinToAReady time. The MaxToAAvailable time indicates a latest time that the LMR feedback frame can be sent to another device. For example, the LMR feedback report may be stored in a memory of the device (e.g., in a buffer) for only a certain amount of time before the resources of the memory have to be released (e.g., MaxToAAvailable is the latest time the LMR feedback report is stored in the memory).

According to some embodiments, the availability window information (e.g., the MinToAReady time and the MaxToAAvailable time) may be exchanged between initiating device and responding device during a negotiation phase between the initiating device and the responding device.

It is understood that the above descriptions are for purposes of illustration and are not meant to be limiting.

Figure 4:
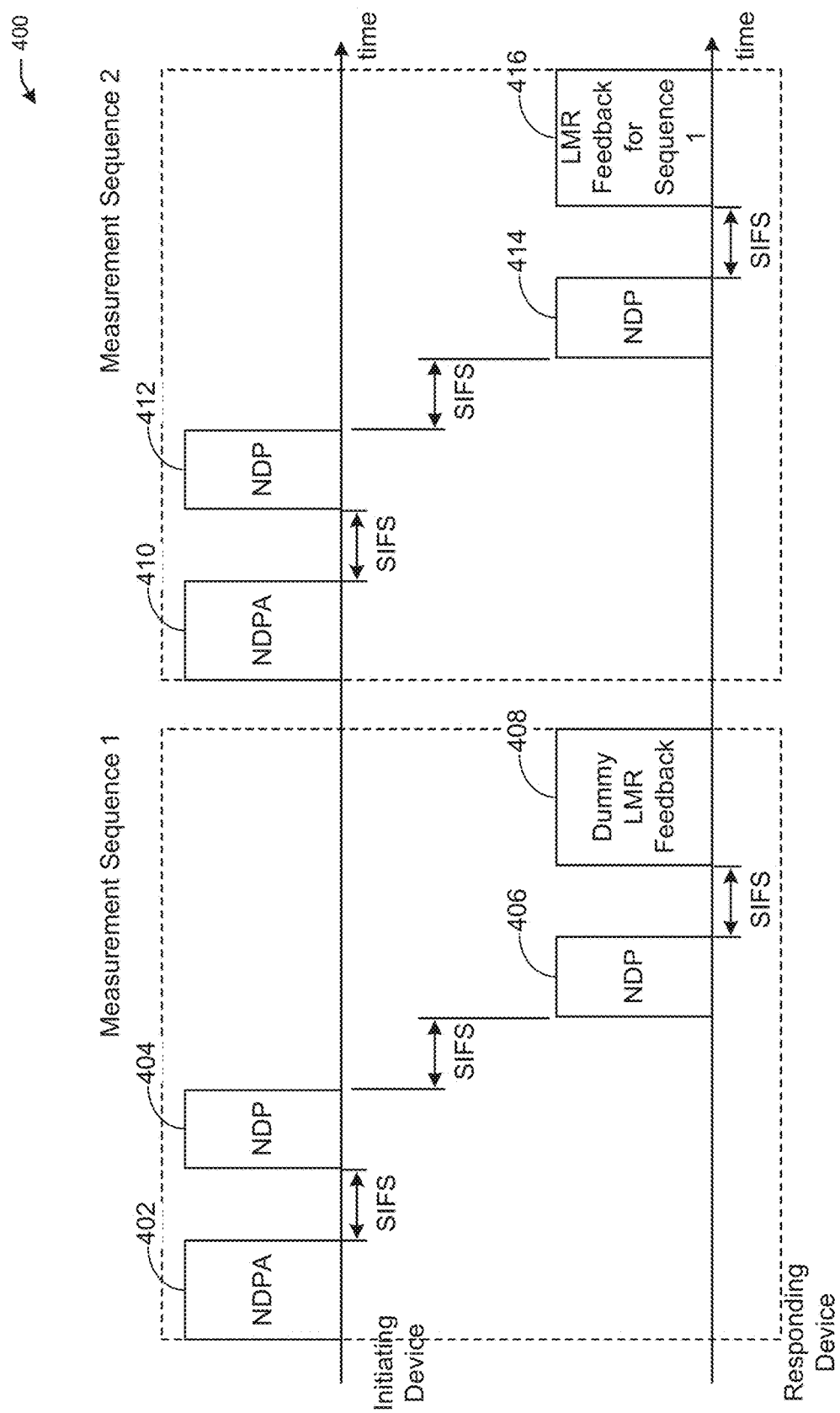
FIG. 4 depicts an illustrative schematic diagram of LMR measurement sequences, in accordance with one or more example embodiments of the present disclosure.

FIG. 4 depicts an illustrative schematic diagram of LMR measurement sequences 400, in accordance with one or more example embodiments of the present disclosure.

Referring to FIG. 4, there is shown a first measurement sequence (e.g., Measurement Sequence 1) and a second measurement sequence (e.g., Measurement Sequence 2) that is subsequent to the first measurement sequence. As illustrated in FIG. 4, Measurement Sequence 1 and Measurement Sequence 2 include the frames illustrated as within their respective dashed boxes. For example, Measurement Sequence 1 includes NDPA frame 402, UL NDP frame 404, DL NDP frame 406, and Dummy LMR feedback frame 408. For example, Measurement Sequence 2 includes NDPA frame 410, UL NDP frame 412, DL NDP frame 414, and LMR feedback frame for Sequence 1 416. A time period, T, may separate Measurement Sequence 1 from Measurement Sequence 2.

The current single-sided LMR feedback sequence in IEEE 802.11az may be used to support two types of LMR feedback, immediate or delayed. For immediate LMR feedback, the responding device may be able to send the LMR feedback frame corresponding to the channel sounding of the current measurement sequence and the LMR feedback frame may be sent within the current measurement sequence (e.g., within a SIFS of sending the DL NPD frame back to the initiating device). For delayed feedback, the responding device may send the LMR feedback frame corresponding to the channel sounding of the previous measurement sequence and the LMR feedback frame may be sent within the current measurement sequence.

According to some embodiments, for delayed LMR feedback, an availability window for LMR may be defined by MinToAReady and MaxToAAvailable. As noted above, this availability window information may be exchanged between the initiating device and the responding device during the negotiation phase. After completing the current round measurement sequence, the initiating device may need to come back to initiate a following round of measurement sequence to solicit the LMR feedback. A time interval, T, between the two rounds measurement sequence may be controlled by the initiating device (e.g., to meet the responding device's LMR availability window requirement).

It is understood that the above descriptions are for purposes of illustration and are not meant to be limiting.

Figure 5:
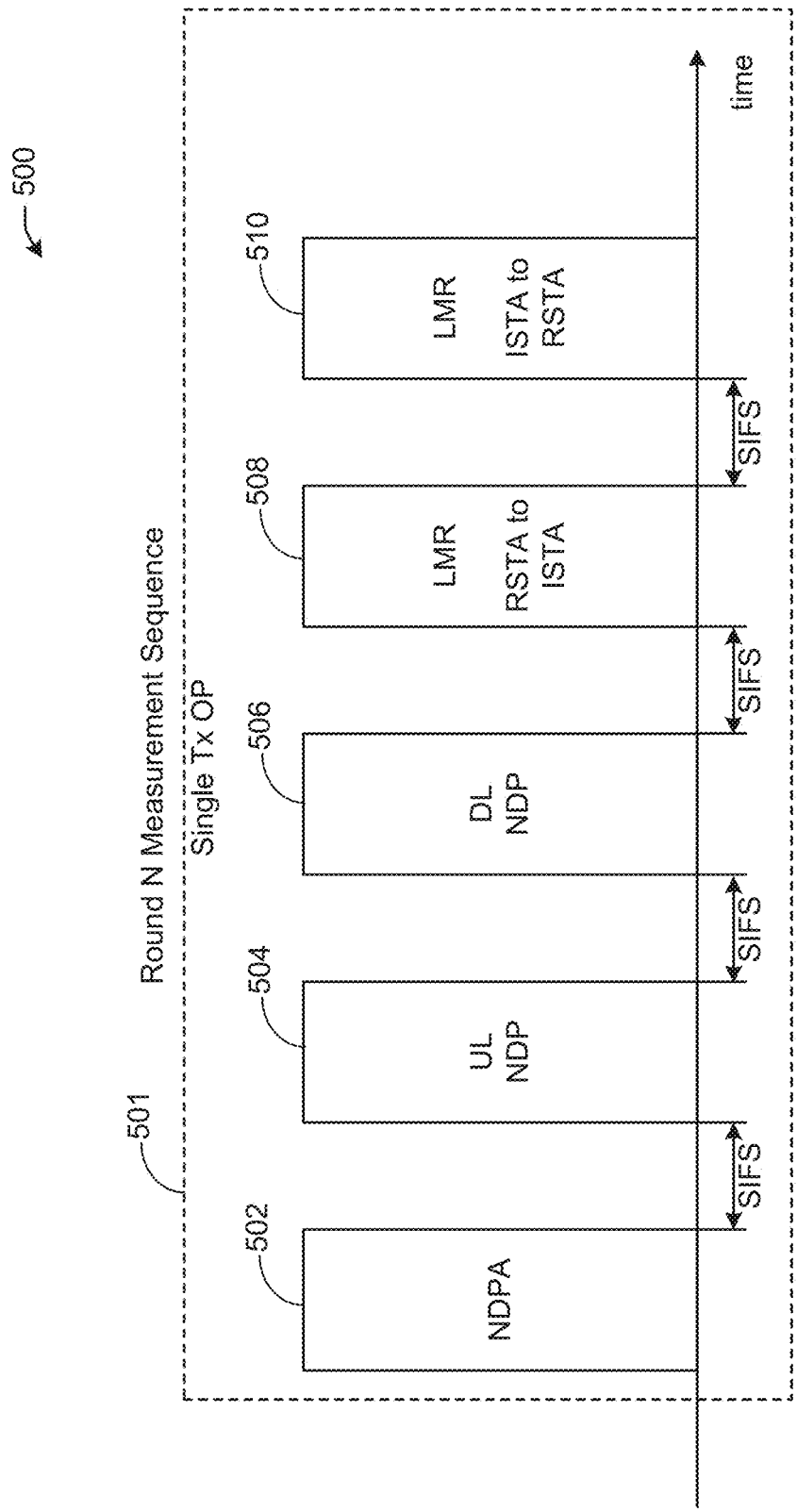
FIG. 5 depicts an illustrative schematic diagram for a bidirectional LMR feedback sequence, in accordance with one or more example embodiments of the present disclosure.

FIG. 5 depicts an illustrative schematic diagram for a bidirectional LMR feedback sequence 500, in accordance with one or more example embodiments of the present disclosure.

Referring to FIG. 5, a bidirectional LMR measurement sequence 500 between an initiating device and a responding device is shown. According to some embodiments, the initiating device may determine to initiate a bidirectional LMR feedback sequence, for example in order to determine a location of the responding device and/or the initiating device.

According to some embodiments, an initiating device may determine to initiate a bidirectional LMR feedback sequence 500. The initiating device may send an NDPA frame 502 to the responding device. The NDPA frame 502 may announce to the responding device the beginning of a bidirectional LMR measurement sequence 500. The initiating device may send an UL NDP frame 504 a short interframe space (SIFS) after the initiating device has sent the NDPA frame 502. In other words, the initiating device may send the NDPA frame 502 to the responding device and, after the duration of a SIFS, the initiating device may send the UL NDP frame 504 to the responding device. The initiating device may determine a time of departure of the UL NDP frame 504 (e.g., the time of departure of the UL NDP frame 504 is also referred to herein as t1).

According to some embodiments, the responding device may receive the NDPA frame 502 from the initiating device. The responding device may determine, in response to receipt of the NDPA frame 502, that an initiating device has begun an LMR measurement sequence. The responding device may receive the UL NDP frame 504 from the initiating device. The responding device may determine a time of arrival of the UL NDP frame 504 (e.g., the time of arrival of the UL NDP frame 504 is also referred to herein as t2).

According to some embodiments, the responding device may send a DL NDP frame 506 to the initiating device. The responding device may send the DL NDP frame 506 to the initiating device after a SIFS after arrival of the UL NDP frame 504. In other words, the responding device may receive the UL NDP frame 504 from the initiating device and, after the duration of a SIFS, the responding device may send the DL NPD frame 506 to the initiating device. The responding device may determine a time of departure of the DL NDP frame 506 (e.g., the time of departure of the DL NDP frame 506 is also referred to herein as t3).

According to some embodiments, the responding device may send an RSTA-to-ISTA LMR feedback frame 508 to the initiating device. The responding device may send the RSTA-to-ISTA LMR feedback frame 508 to the responding device after a SIFS after sending the DL NDP frame 506. In other words, the responding device may send the DL NDP frame 506 to the initiating device and, after the duration of a SIFS, the responding device may send the RSTA-to-ISTA LMR feedback frame 508 to the initiating device. The RSTA-to-ISTA LMR feedback frame 508 may include the time of arrival of the UL NDP frame 504 (e.g., t2) and the time of departure of the DL NDP frame 506 (e.g., t3).

According to some embodiments, the initiating device may receive the DL NDP frame 506 from the responding device. The initiating device may determine a time of arrival of the DL NDP frame 506 (e.g., the time of arrival of the DL NDP frame 506 is also referred to herein as t4). The initiating device may receive the RSTA-to-ISTA LMR feedback frame 508 from the responding device. As noted above, the RSTA-to-ISTA LMR feedback frame 508 may include the time of arrival of the UL NDP frame 504 (e.g., t2) and the time of departure of the DL NDP frame 506 (e.g., t3). Using the information in the LMR feedback frame 508 (e.g., using t2 and t3) and the information determined by the initiating device (e.g., t1 and t4), the initiating device may determine a range to the responding device.

According to some embodiments, the initiating device may send an ISTA-to-RSTA LMR feedback frame 510 to the responding device. The initiating device may send the ISTA-to-RSTA LMR feedback frame 510 to the responding device after a SIFS after receiving the RSTA-to-ISTA LMR feedback frame 508. In other words, the initiating device may receive the RSTA-to-ISTA LMR feedback frame 508 from the responding device and, after the duration of a SIFS, the initiating device may send the ISTA-to-RSTA LMR feedback frame 510 to the responding device. The ISTA-to-RSTA LMR feedback frame 510 may include the time of departure of the UL NDP frame 504 (e.g., t1) and the time of arrival of the DL NDP frame 506 (e.g., t4).

According to some embodiments, the responding device may receive the ISTA-to-RSTA LMR feedback frame 510 from the initiating device. As noted above, the ISTA-to-RSTA LMR feedback frame 510 may include the time of departure of the UL NDP frame 504 (e.g., t1) and the time of arrival of the DL NDP frame 506 (e.g., t4). Using the information in the ISTA-to-RSTA LMR feedback frame 510 (e.g., using t1 and t4) and the information determined by the responding device (e.g., t2 and t3), the responding device may determine a range to the initiating device.

In the current IEEE TGaz specification, support for two-sided LMR feedback between responding device and the initiating device, which enables the AP-to-STA LMR feedback and STA-to-AP LMR feedback, was agreed to. However, the details of the design have not been completed. For the MU scenario, because there is a predefined recurring availability window for the measurement sequence, the AP and STA may use these availability windows to exchange the two-sided LMR. However, for the SU scenario, there is no recurring availability window and the measurement sequence may usually (or always) be initialized by the initiating device. Hence, a responding rule needs to be defined for the initiating device to enable the efficient exchange of the two-sided LMR between the initiating device and the responding device.

It is understood that the above descriptions are for purposes of illustration and are not meant to be limiting.

Figure 6:
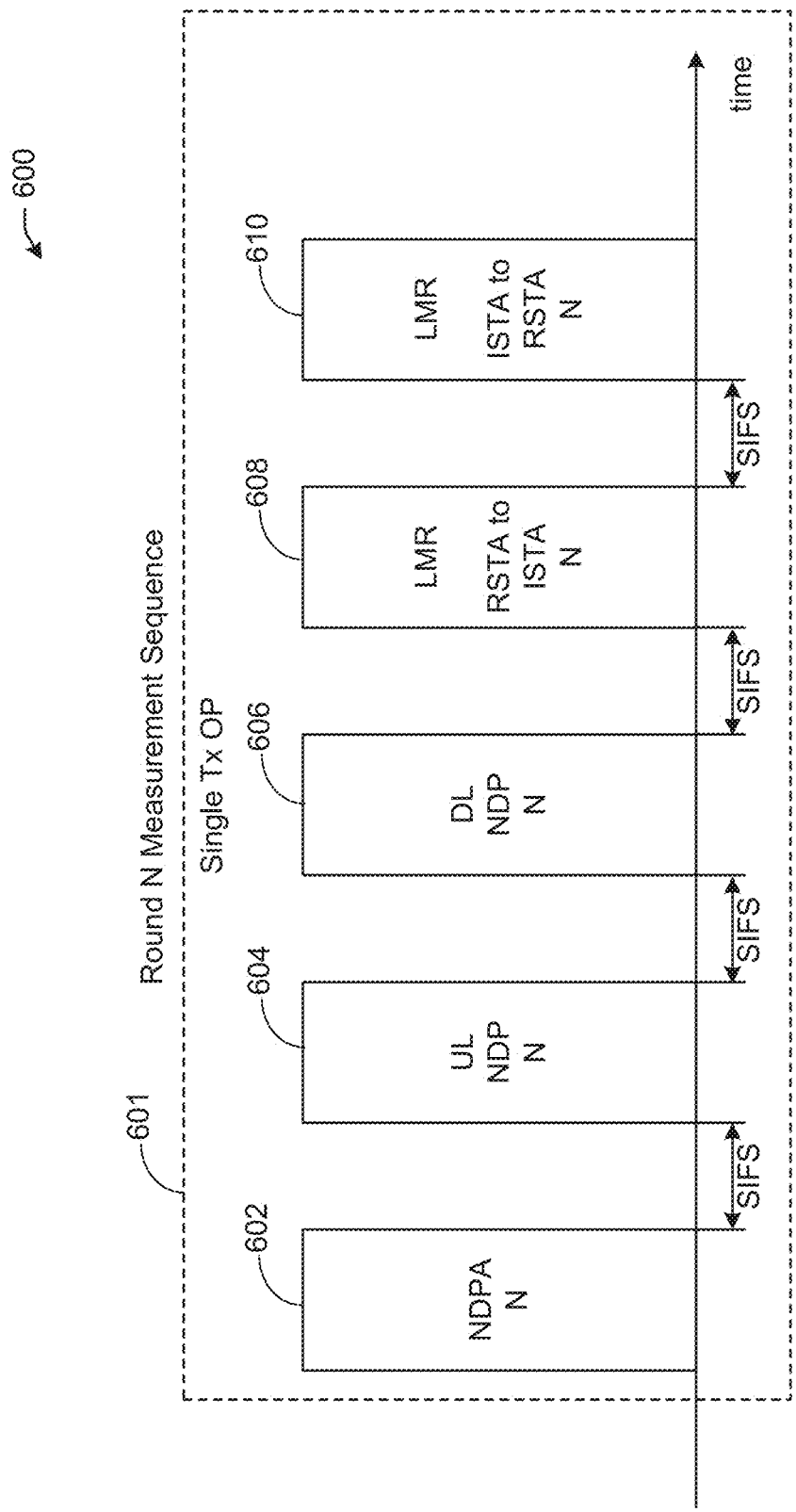
FIG. 6 depicts an illustrative schematic diagram for a bidirectional LMR feedback sequence, in accordance with one or more example embodiments of the present disclosure.
Figure 7:
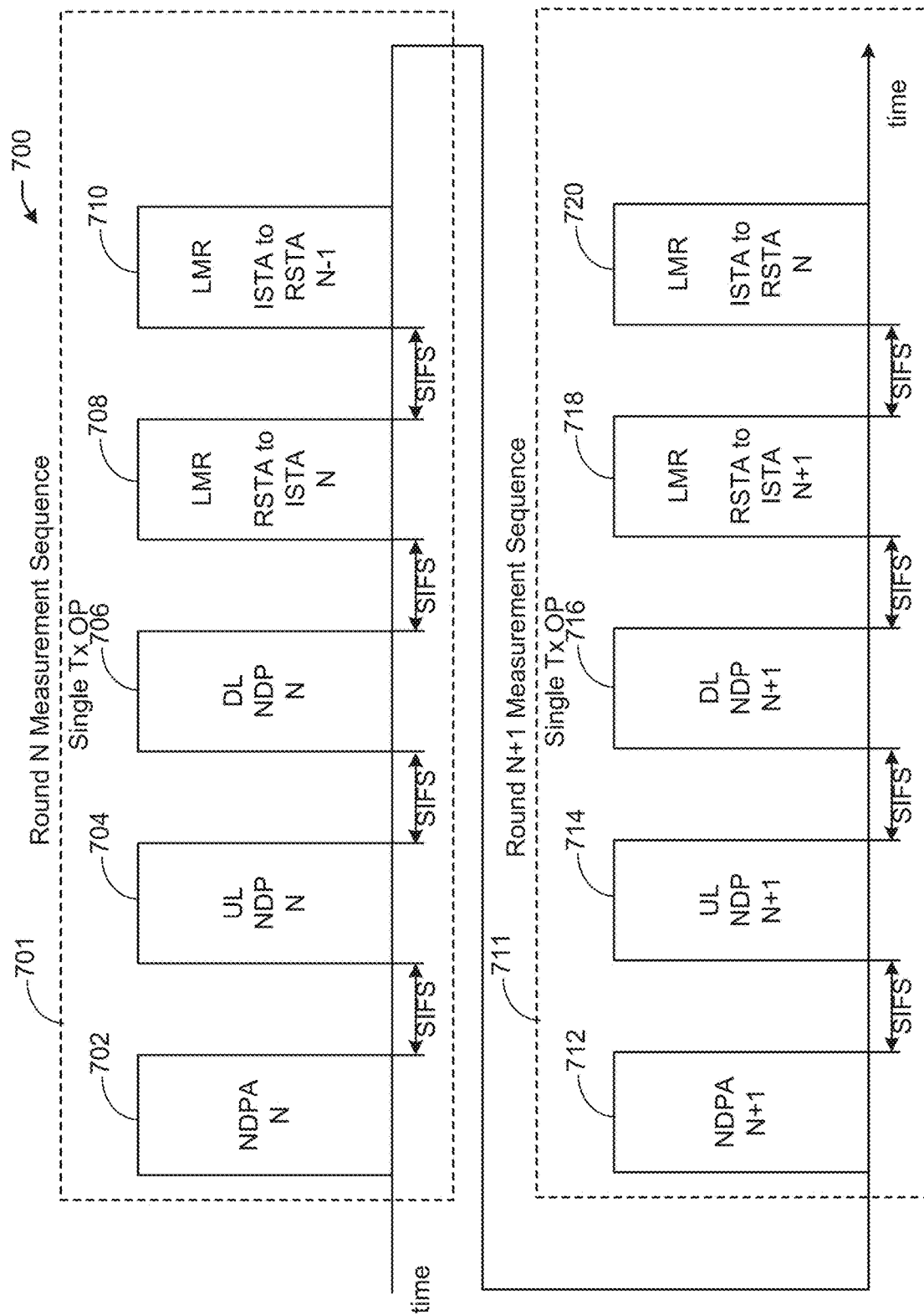
FIG. 7 depicts an illustrative schematic diagram for a bidirectional LMR feedback sequence, in accordance with one or more example embodiments of the present disclosure.
Figure 8:
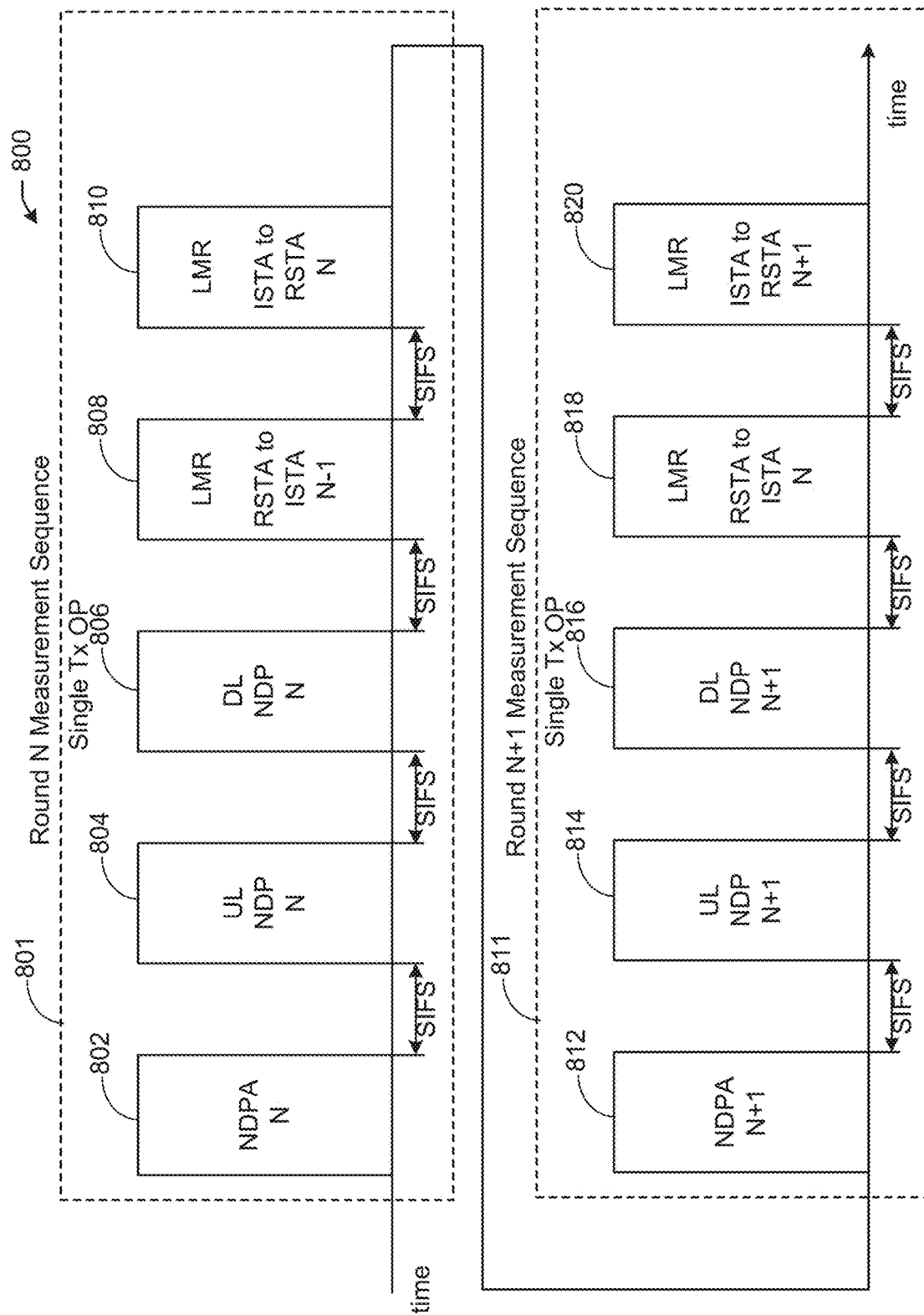
FIG. 8 depicts an illustrative schematic diagram for a bidirectional LMR feedback sequence, in accordance with one or more example embodiments of the present disclosure.
Figure 9:
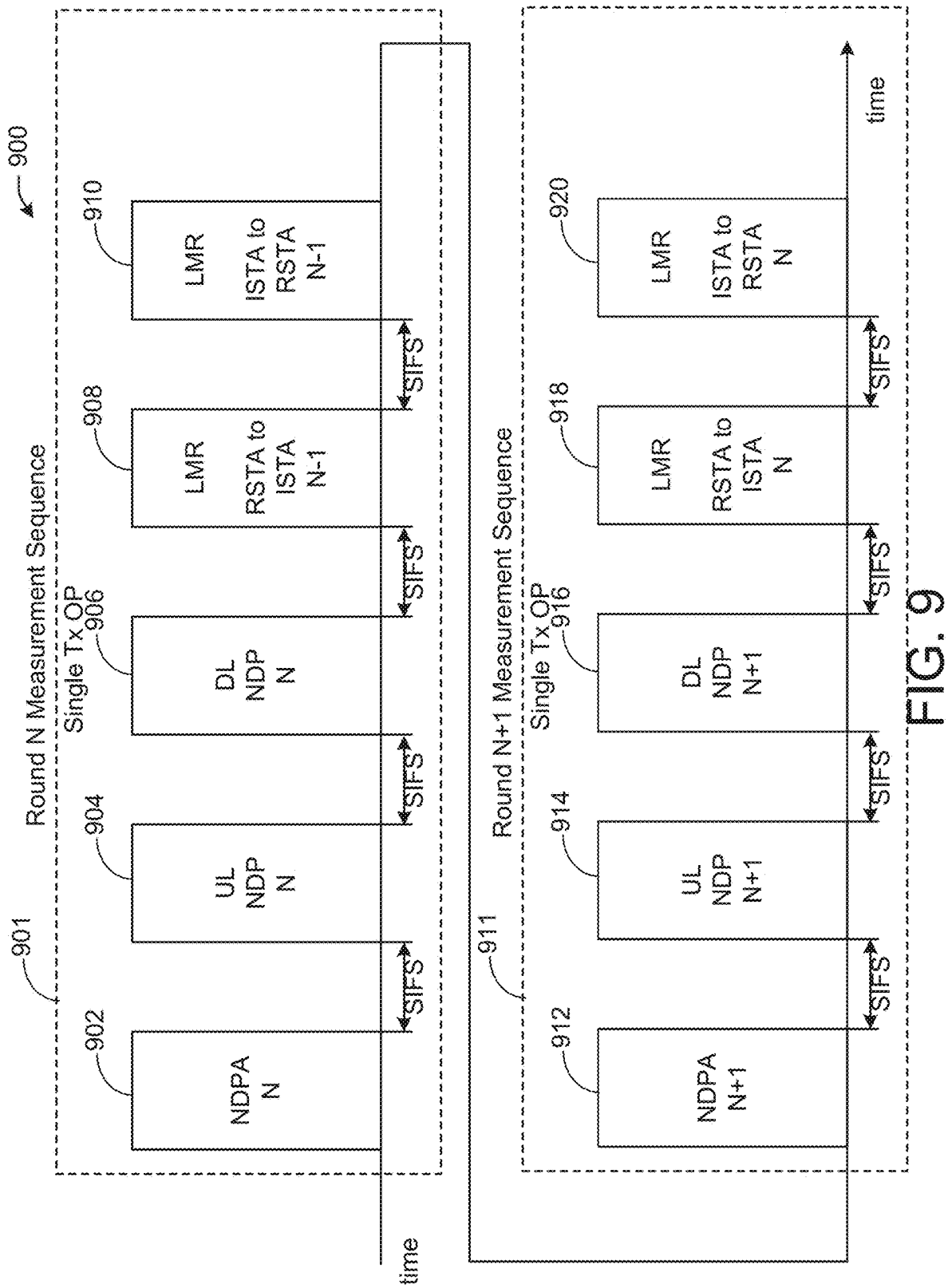
FIG. 9 depicts an illustrative schematic diagram for a bidirectional LMR feedback sequence, in accordance with one or more example embodiments of the present disclosure.

In one embodiment, the initiating and responding devices may be allowed to support different LMR feedback types. For example, the four following combinations of LMR feedback types may be supported. First, both the initiating device and the responding device may provide immediate LMR feedback. This scenario is illustrated in FIG. 6. Second, the responding device may provide immediate LMR feedback and the initiating device may provide delayed LMR feedback. This scenario is illustrated in FIG. 7. Third, the initiating device may provide immediate LMR feedback and the responding device may provide delayed LMR feedback. This scenario is illustrated in FIG. 8. Fourth, both the initiating device and the responding device may provide delayed LMR feedback. This scenario is illustrated in FIG. 9.

FIG. 6 depicts an illustrative schematic diagram for a bidirectional LMR feedback sequence 600, in accordance with one or more example embodiments of the present disclosure.

Referring to FIG. 6, there is shown a scenario in which both the initiating device and the responding device provide immediate LMR feedback. According to some embodiments, the initiating device may determine to initiate a bidirectional LMR feedback sequence, for example in order to determine a location of the responding device and/or the initiating device.

According to some embodiments, an initiating device may determine to initiate a bidirectional LMR feedback sequence 600. The current bidirectional LMR feedback sequence 600 may be one of N bidirectional LMR feedback sequences, wherein N is a positive integer. The initiating device may send an NDPA frame 602 to the responding device. The NDPA frame 602 may announce to the responding device the beginning of a bidirectional LMR measurement sequence 600. The initiating device may send an UL NDP frame 604 a short interframe space (SIFS) after the initiating device has sent the NDPA frame 602. In other words, the initiating device may send the NDPA frame 602 to the responding device and, after the duration of a SIFS, the initiating device may send the UL NDP frame 604 to the responding device. The initiating device may determine a time of departure of the UL NDP frame 604 (e.g., the time of departure of the UL NDP frame 604 is also referred to herein as t1).

According to some embodiments, the responding device may receive the NDPA frame 602 from the initiating device. The responding device may determine, in response to receipt of the NDPA frame 602, that an initiating device has begun an LMR measurement sequence. The responding device may receive the UL NDP frame 604 from the initiating device. The responding device may determine a time of arrival of the UL NDP frame 604 (e.g., the time of arrival of the UL NDP frame 604 is also referred to herein as t2).

According to some embodiments, the responding device may send a DL NDP frame 606 to the initiating device. The responding device may send the DL NDP frame 606 to the initiating device after a SIFS after arrival of the UL NDP frame 604. In other words, the responding device may receive the UL NDP frame 604 from the initiating device and, after the duration of a SIFS, the responding device may send the DL NPD frame 606 to the initiating device. The responding device may determine a time of departure of the DL NDP frame 606 (e.g., the time of departure of the DL NDP frame 606 is also referred to herein as t3).

According to some embodiments, the responding device may send an RSTA-to-ISTA LMR feedback frame for the round N measurement sequence 608 to the initiating device. The responding device may send the RSTA-to-ISTA LMR feedback frame for the round N measurement sequence 608 to the responding device after a SIFS after sending the DL NDP frame 606. In other words, the responding device may send the DL NDP frame 606 to the initiating device and, after the duration of a SIFS, the responding device may send the RSTA-to-ISTA LMR feedback frame for the round N measurement sequence 608 to the initiating device. The RSTA-to-ISTA LMR feedback frame for the round N measurement sequence 608 may include the time of arrival of the UL NDP frame 604 (e.g., t2) and the time of departure of the DL NDP frame 606 (e.g., t3).

According to some embodiments, the initiating device may receive the DL NDP frame 606 from the responding device. The initiating device may determine a time of arrival of the DL NDP frame 606 (e.g., the time of arrival of the DL NDP frame 606 is also referred to herein as t4). The initiating device may receive the RSTA-to-ISTA LMR feedback frame for the round N measurement sequence 608 from the responding device. As noted above, the RSTA-to-ISTA LMR feedback frame for the round N measurement sequence 608 may include the time of arrival of the UL NDP frame 604 (e.g., t2) and the time of departure of the DL NDP frame 606 (e.g., t3). Using the information in the LMR feedback frame for the round N measurement sequence 608 (e.g., using t2 and t3) and the information determined by the initiating device (e.g., t1 and t4), the initiating device may determine a range to the responding device.

According to some embodiments, the initiating device may send an ISTA-to-RSTA LMR feedback frame for the round N measurement sequence 610 to the responding device. The initiating device may send the ISTA-to-RSTA LMR feedback frame for the round N measurement sequence 610 to the responding device after a SIFS after receiving the RSTA-to-ISTA LMR feedback frame for the round N measurement sequence 608. In other words, the initiating device may receive the RSTA-to-ISTA LMR feedback frame for the round N measurement sequence 608 from the responding device and, after the duration of a SIFS, the initiating device may send the ISTA-to-RSTA LMR feedback frame for the round N measurement sequence 610 to the responding device. The ISTA-to-RSTA LMR feedback frame for the round N measurement sequence 610 may include the time of departure of the UL NDP frame 604 (e.g., t1) and the time of arrival of the DL NDP frame 606 (e.g., t4).

According to some embodiments, the responding device may receive the ISTA-to-RSTA LMR feedback frame for the round N measurement sequence 610 from the initiating device. As noted above, the ISTA-to-RSTA LMR feedback frame for the round N measurement sequence 610 may include the time of departure of the UL NDP frame 604 (e.g., t1) and the time of arrival of the DL NDP frame 606 (e.g., t4). Using the information in the ISTA-to-RSTA LMR feedback frame for the round N measurement sequence 610 (e.g., using t1 and t4) and the information determined by the responding device (e.g., t2 and t3), the responding device may determine a range to the initiating device.

It is understood that the above descriptions are for purposes of illustration and are not meant to be limiting.

FIG. 7 depicts an illustrative schematic diagram for a bidirectional LMR feedback sequence 700, in accordance with one or more example embodiments of the present disclosure.

Referring to FIG. 7, there is shown a scenario in which the initiating device may provide delayed LMR feedback and the responding device may provide immediate LMR feedback. According to some embodiments, the initiating device may determine to initiate a bidirectional LMR feedback sequence, for example in order to determine a location of the responding device and/or the initiating device.

According to some embodiments, an initiating device may determine to initiate a bidirectional LMR feedback sequence 700. The current bidirectional LMR feedback sequence 701 may be one of N bidirectional LMR feedback sequences, wherein N is a positive integer. The initiating device may send an NDPA frame 702 to the responding device. The NDPA frame 702 may announce to the responding device the beginning of a bidirectional LMR measurement sequence 701. The initiating device may send an UL NDP frame 704 a short interframe space (SIFS) after the initiating device has sent the NDPA frame 702. In other words, the initiating device may send the NDPA frame 702 to the responding device and, after the duration of a SIFS, the initiating device may send the UL NDP frame 704 to the responding device. The initiating device may determine a time of departure of the UL NDP frame 704 (e.g., the time of departure of the UL NDP frame 704 is also referred to herein as t1).

According to some embodiments, the responding device may receive the NDPA frame 702 from the initiating device. The responding device may determine, in response to receipt of the NDPA frame 702, that an initiating device has begun an LMR measurement sequence. The responding device may receive the UL NDP frame 704 from the initiating device. The responding device may determine a time of arrival of the UL NDP frame 704 (e.g., the time of arrival of the UL NDP frame 704 is also referred to herein as t2).

According to some embodiments, the responding device may send a DL NDP frame 706 to the initiating device. The responding device may send the DL NDP frame 706 to the initiating device after a SIFS after arrival of the UL NDP frame 704. In other words, the responding device may receive the UL NDP frame 704 from the initiating device and, after the duration of a SIFS, the responding device may send the DL NPD frame 706 to the initiating device. The responding device may determine a time of departure of the DL NDP frame 706 (e.g., the time of departure of the DL NDP frame 706 is also referred to herein as t3).

According to some embodiments, the responding device may send an RSTA-to-ISTA LMR feedback frame for the round N measurement sequence 708 to the initiating device. The responding device may send the RSTA-to-ISTA LMR feedback frame for the round N measurement sequence 708 to the responding device after a SIFS after sending the DL NDP frame 706. In other words, the responding device may send the DL NDP frame 706 to the initiating device and, after the duration of a SIFS, the responding device may send the RSTA-to-ISTA LMR feedback frame for the round N measurement sequence 708 to the initiating device. The RSTA-to-ISTA LMR feedback frame for the round N measurement sequence 708 may include the time of arrival of the UL NDP frame 704 (e.g., t2) and the time of departure of the DL NDP frame 706 (e.g., t3).

According to some embodiments, the initiating device may receive the DL NDP frame 706 from the responding device. The initiating device may determine a time of arrival of the DL NDP frame 706 (e.g., the time of arrival of the DL NDP frame 706 is also referred to herein as t4). The initiating device may receive the RSTA-to-ISTA LMR feedback frame for the round N measurement sequence 708 from the responding device. As noted above, the RSTA-to-ISTA LMR feedback frame for the round N measurement sequence 708 may include the time of arrival of the UL NDP frame 704 (e.g., t2) and the time of departure of the DL NDP frame 706 (e.g., t3). Using the information in the LMR feedback frame for the round N measurement sequence 708 (e.g., using t2 and t3) and the information determined by the initiating device (e.g., t1 and t4), the initiating device may determine a location of the responding device and/or a location of the initiating device.

According to some embodiments, the initiating device may send an ISTA-to-RSTA LMR feedback frame for the round N−1 measurement sequence 710 to the responding device. The initiating device may send the ISTA-to-RSTA LMR feedback frame for the round N−1 measurement sequence 710 to the responding device after a SIFS after receiving the RSTA-to-ISTA LMR feedback frame for the round N measurement sequence 708. In other words, the initiating device may receive the RSTA-to-ISTA LMR feedback frame for the round N measurement sequence 708 from the responding device and, after the duration of a SIFS, the initiating device may send the ISTA-to-RSTA LMR feedback frame for the round N−1 measurement sequence 710 to the responding device. The ISTA-to-RSTA LMR feedback frame for the round N−1 measurement sequence 710 may include the time of departure of the UL NDP frame 704 (e.g., t1) and the time of arrival of the DL NDP frame 706 (e.g., t4). Note that for N equal to 1, the ISTA-to-RSTA LMR feedback frame for the round N−1 measurement sequence 710 may include dummy values for the ToA and ToD values (e.g., for t1 and t4).

According to some embodiments, the responding device may receive the ISTA-to-RSTA LMR feedback frame for the round N−1 measurement sequence 710 from the initiating device. As noted above, the ISTA-to-RSTA LMR feedback frame for the round N−1 measurement sequence 710 may include the time of departure of the UL NDP frame 704 (e.g., t1) and the time of arrival of the DL NDP frame 706 (e.g., t4). Using the information in the ISTA-to-RSTA LMR feedback frame for the round N−1 measurement sequence 710 (e.g., using t1 and t4) and the information determined by the responding device (e.g., t2 and t3), the responding device may determine a range to the initiating device.

In one embodiment, after the current round of measurement sequence (e.g., after round N) is completed, the initiating device may need to start a following round of measurement sequence 711 (e.g., round N+1) to send the delayed LMR feedback (ISTA-to-RSTA for the round N measurement sequence) to the responding device. In other words, the initiating device may need to start the round of measurement sequence that includes the exchange of NDPA frame 712, UL NDP frame 714, DL NDP frame 716, the RSTA-to-ISTA LMR feedback frame for the round N+1 measurement sequence 718, and the ISTA-to-RSTA LMR feedback frame for the round N measurement sequence 720. A time interval T between the round N and round N+1 measurement sequences may be controlled by the initiating device such that a value of T should be within the initiating device's time of arrival availability window (e.g., within MinToAReady and MaxToAAvailable).

It is understood that the above descriptions are for purposes of illustration and are not meant to be limiting.

FIG. 8 depicts an illustrative schematic diagram for a bidirectional LMR feedback sequence 800, in accordance with one or more example embodiments of the present disclosure.

Referring to FIG. 8, there is shown a scenario in which the initiating device may provide immediate LMR feedback and the responding device may provide delayed LMR feedback. According to some embodiments, the initiating device may determine to initiate a bidirectional LMR feedback sequence, for example in order to determine a range of the initiating device and/or responding device.

According to some embodiments, an initiating device may determine to initiate a bidirectional LMR feedback sequence 800. The current bidirectional LMR feedback sequence 801 may be one of N bidirectional LMR feedback sequences, wherein N is a positive integer. The initiating device may send an NDPA frame 802 to the responding device. The NDPA frame 802 may announce to the responding device the beginning of a bidirectional LMR measurement sequence 801. The initiating device may send an UL NDP frame 804 a short interframe space (SIFS) after the initiating device has sent the NDPA frame 802. In other words, the initiating device may send the NDPA frame 802 to the responding device and, after the duration of a SIFS, the initiating device may send the UL NDP frame 804 to the responding device. The initiating device may determine a time of departure of the UL NDP frame 804 (e.g., the time of departure of the UL NDP frame 804 is also referred to herein as t1).

According to some embodiments, the responding device may receive the NDPA frame 802 from the initiating device. The responding device may determine, in response to receipt of the NDPA frame 802, that an initiating device has begun an LMR measurement sequence. The responding device may receive the UL NDP frame 804 from the initiating device. The responding device may determine a time of arrival of the UL NDP frame 804 (e.g., the time of arrival of the UL NDP frame 804 is also referred to herein as t2).

According to some embodiments, the responding device may send a DL NDP frame 806 to the initiating device. The responding device may send the DL NDP frame 806 to the initiating device after a SIFS after arrival of the UL NDP frame 804. In other words, the responding device may receive the UL NDP frame 804 from the initiating device and, after the duration of a SIFS, the responding device may send the DL NPD frame 806 to the initiating device. The responding device may determine a time of departure of the DL NDP frame 806 (e.g., the time of departure of the DL NDP frame 806 is also referred to herein as t3).

According to some embodiments, the responding device may send an RSTA-to-ISTA LMR feedback frame for the round N−1 measurement sequence 808 to the initiating device. The responding device may send the RSTA-to-ISTA LMR feedback frame for the round N−1 measurement sequence 808 to the initiating device after a SIFS after sending the DL NDP frame 806. In other words, the responding device may send the DL NDP frame 806 to the initiating device and, after the duration of a SIFS, the responding device may send the RSTA-to-ISTA LMR feedback frame for the round N−1 measurement sequence 808 to the initiating device. The RSTA-to-ISTA LMR feedback frame for the round N−1 measurement sequence 808 may include the time of arrival of the UL NDP frame 804 (e.g., t2) and the time of departure of the DL NDP frame 806 (e.g., t3). Note that for N equal to 1, the RSTA-to-ISTA LMR feedback frame for the round N−1 measurement sequence 808 may include dummy values for the ToA and ToD values (e.g., for t2 and t3).

According to some embodiments, the initiating device may receive the DL NDP frame 806 from the responding device. The initiating device may determine a time of arrival of the DL NDP frame 806 (e.g., the time of arrival of the DL NDP frame 806 is also referred to herein as t4). The initiating device may receive the RSTA-to-ISTA LMR feedback frame for the round N−1 measurement sequence 808 from the responding device. As noted above, the RSTA-to-ISTA LMR feedback frame for the round N−1 measurement sequence 808 may include the time of arrival of the UL NDP frame 804 (e.g., t2) and the time of departure of the DL NDP frame 806 (e.g., t3). Using the information in the LMR feedback frame for the round N−1 measurement sequence 808 (e.g., using t2 and t3) and the information determined by the initiating device (e.g., t1 and t4), the initiating device may determine a range to the responding device.

According to some embodiments, the initiating device may send an ISTA-to-RSTA LMR feedback frame for the round N measurement sequence 810 to the responding device. The initiating device may send the ISTA-to-RSTA LMR feedback frame for the round N measurement sequence 810 to the responding device after a SIFS after receiving the RSTA-to-ISTA LMR feedback frame for the round N−1 measurement sequence 808. In other words, the initiating device may receive the RSTA-to-ISTA LMR feedback frame for the round N−1 measurement sequence 808 from the responding device and, after the duration of a SIFS, the initiating device may send the ISTA-to-RSTA LMR feedback frame for the round N measurement sequence 810 to the responding device. The ISTA-to-RSTA LMR feedback frame for the round N measurement sequence 810 may include the time of departure of the UL NDP frame 804 (e.g., t1) and the time of arrival of the DL NDP frame 806 (e.g., t4).

According to some embodiments, the responding device may receive the ISTA-to-RSTA LMR feedback frame for the round N measurement sequence 810 from the initiating device. As noted above, the ISTA-to-RSTA LMR feedback frame for the round N measurement sequence 810 may include the time of departure of the UL NDP frame 804 (e.g., t1) and the time of arrival of the DL NDP frame 806 (e.g., t4). Using the information in the ISTA-to-RSTA LMR feedback frame for the round N measurement sequence 810 (e.g., using t1 and t4) and the information determined by the responding device (e.g., t2 and t3), the responding device may determine a range to the initiating device.

In one embodiment, after the current round of measurement sequence (e.g., after round N) is completed, the initiating device may need to start a following round of measurement sequence 811 (e.g., round N+1) to receive the delayed LMR feedback (RSTA-to-ISTA for the round N measurement sequence) from the initiating device. In other words, the initiating device may need to start the round of measurement sequence that includes the exchange of NDPA frame 812, UL NDP frame 814, DL NDP frame 816, the RSTA-to-ISTA LMR feedback frame for the round N measurement sequence 818, and the ISTA-to-RSTA LMR feedback frame for the round N+1 measurement sequence 820. A time interval T between the round N and round N+1 measurement sequences may be controlled by the initiating device such that a value of T should be within the responding device's time of arrival availability window (e.g., within MinToAReady and MaxToAAvailable).

It is understood that the above descriptions are for purposes of illustration and are not meant to be limiting.

FIG. 9 depicts an illustrative schematic diagram for bidirectional LMR feedback, in accordance with one or more example embodiments of the present disclosure.

Referring to FIG. 9, there is shown a scenario in which both the initiating device and the responding device may provide delayed LMR feedback. According to some embodiments, the initiating device may determine to initiate a bidirectional LMR feedback sequence, for example in order to determine a location of the responding device and/or the initiating device.

According to some embodiments, an initiating device may determine to initiate a bidirectional LMR feedback sequence 900. The current bidirectional LMR feedback sequence 901 may be one of N bidirectional LMR feedback sequences, wherein N is a positive integer. The initiating device may send an NDPA frame 902 to the responding device. The NDPA frame 902 may announce to the responding device the beginning of a bidirectional LMR measurement sequence 901. The initiating device may send an UL NDP frame 904 a short interframe space (SIFS) after the initiating device has sent the NDPA frame 902. In other words, the initiating device may send the NDPA frame 902 to the responding device and, after the duration of a SIFS, the initiating device may send the UL NDP frame 904 to the responding device. The initiating device may determine a time of departure of the UL NDP frame 904 (e.g., the time of departure of the UL NDP frame 904 is also referred to herein as t1).

According to some embodiments, the responding device may receive the NDPA frame 902 from the initiating device. The responding device may determine, in response to receipt of the NDPA frame 902, that an initiating device has begun an LMR measurement sequence. The responding device may receive the UL NDP frame 904 from the initiating device. The responding device may determine a time of arrival of the UL NDP frame 904 (e.g., the time of arrival of the UL NDP frame 904 is also referred to herein as t2).

According to some embodiments, the responding device may send a DL NDP frame 906 to the initiating device. The responding device may send the DL NDP frame 906 to the initiating device after a SIFS after arrival of the UL NDP frame 904. In other words, the responding device may receive the UL NDP frame 904 from the initiating device and, after the duration of a SIFS, the responding device may send the DL NPD frame 906 to the initiating device. The responding device may determine a time of departure of the DL NDP frame 906 (e.g., the time of departure of the DL NDP frame 906 is also referred to herein as t3).

According to some embodiments, the responding device may send an RSTA-to-ISTA LMR feedback frame for the round N−1 measurement sequence 908 to the initiating device. The responding device may send the RSTA-to-ISTA LMR feedback frame for the round N−1 measurement sequence 908 to the responding device after a SIFS after sending the DL NDP frame 906. In other words, the responding device may send the DL NDP frame 906 to the initiating device and, after the duration of a SIFS, the responding device may send the RSTA-to-ISTA LMR feedback frame for the round N−1 measurement sequence 908 to the initiating device. The RSTA-to-ISTA LMR feedback frame for the round N−1 measurement sequence 908 may include the time of arrival of the UL NDP frame 904 (e.g., t2) and the time of departure of the DL NDP frame 906 (e.g., t3). Note that for N equal to 1, the RSTA-to-ISTA LMR feedback frame for the round N−1 measurement sequence 908 may include dummy values for the ToA and ToD values (e.g., for t2 and t3).

According to some embodiments, the initiating device may receive the DL NDP frame 906 from the responding device. The initiating device may determine a time of arrival of the DL NDP frame 906 (e.g., the time of arrival of the DL NDP frame 906 is also referred to herein as t4). The initiating device may receive the RSTA-to-ISTA LMR feedback frame for the round N−1 measurement sequence 908 from the responding device. As noted above, the RSTA-to-ISTA LMR feedback frame for the round N−1 measurement sequence 908 may include the time of arrival of the UL NDP frame 904 (e.g., t2) and the time of departure of the DL NDP frame 906 (e.g., t3). Using the information in the LMR feedback frame for the round N−1 measurement sequence 908 (e.g., using t2 and t3) and the information determined by the initiating device (e.g., t1 and t4), the initiating device may determine a range to the responding device.

According to some embodiments, the initiating device may send an ISTA-to-RSTA LMR feedback frame for the round N−1 measurement sequence 910 to the responding device. The initiating device may send the ISTA-to-RSTA LMR feedback frame for the round N−1 measurement sequence 910 to the responding device after a SIFS after receiving the RSTA-to-ISTA LMR feedback frame for the round N−1 measurement sequence 908. In other words, the initiating device may receive the RSTA-to-ISTA LMR feedback frame for the round N−1 measurement sequence 908 from the responding device and, after the duration of a SIFS, the initiating device may send the ISTA-to-RSTA LMR feedback frame for the round N−1 measurement sequence 910 to the responding device. The ISTA-to-RSTA LMR feedback frame for the round N−1 measurement sequence 910 may include the time of departure of the UL NDP frame 904 (e.g., t1) and the time of arrival of the DL NDP frame 906 (e.g., t4).

According to some embodiments, the responding device may receive the ISTA-to-RSTA LMR feedback frame for the round N−1 measurement sequence 910 from the initiating device. As noted above, the ISTA-to-RSTA LMR feedback frame for the round N−1 measurement sequence 910 may include the time of departure of the UL NDP frame 904 (e.g., t1) and the time of arrival of the DL NDP frame 906 (e.g., t4). Using the information in the ISTA-to-RSTA LMR feedback frame for the round N−1 measurement sequence 910 (e.g., using t1 and t4) and the information determined by the responding device (e.g., t2 and t3), the responding device may determine a location of the responding device and/or a location of the initiating device.

In one embodiment, after the current round of measurement sequence (e.g., after round N) is completed, the initiating device may need to start a following round of measurement sequence 911 (e.g., round N+1) to receive the delayed LMR feedback (RSTA-to-ISTA for the round N−1 measurement sequence and ISTA-to-RSTA for the round N−1 measurement sequence) from the initiating device. In other words, the initiating device may need to start the round of measurement sequence that includes the exchange of NDPA frame 912, UL NDP frame 914, DL NDP frame 916, the RSTA-to-ISTA LMR feedback frame for the round N measurement sequence 918, and the ISTA-to-RSTA LMR feedback frame for the round N measurement sequence 920. A time interval T between the round N and round N+1 measurement sequences may be controlled by the initiating device such that a value of T should be within both the responding device's time of arrival availability window and within the initiating device's time of arrival availability window (e.g., within MinToAReady and MaxToAAvailable), as discussed in greater detail below.

It is understood that the above descriptions are for purposes of illustration and are not meant to be limiting.

FIGS. 10A-10D depict schematic diagrams for bidirectional LMR feedback, in accordance with one or more example embodiments of the present disclosure.

In one embodiment, the initiating device and the responding device may exchange the ToA availability information [MinToAReady, MaxToAAvaialble] during the negotiation phase, and the initiating device may use a fine timing measurement (FTM) request frame to send its ToA availability window information to the responding device. Based on the initiating device's availability window and on the responding device's own availability window, the responding device may determine a negotiated availability window. The responding device may use an FTM response frame to send its negotiated ToA availability window information to the initiating device. To achieve an efficient exchange of the two-sided LMR feedback frames, the responding device should select the negotiated availability window such that both the initiating device's and the responding device's ToA/ToD are available within this window. Four scenarios are disclosed below with respect to FIGS. 10A-10D to explain how the responding device selects the negotiated availability window.

Figure 10A:
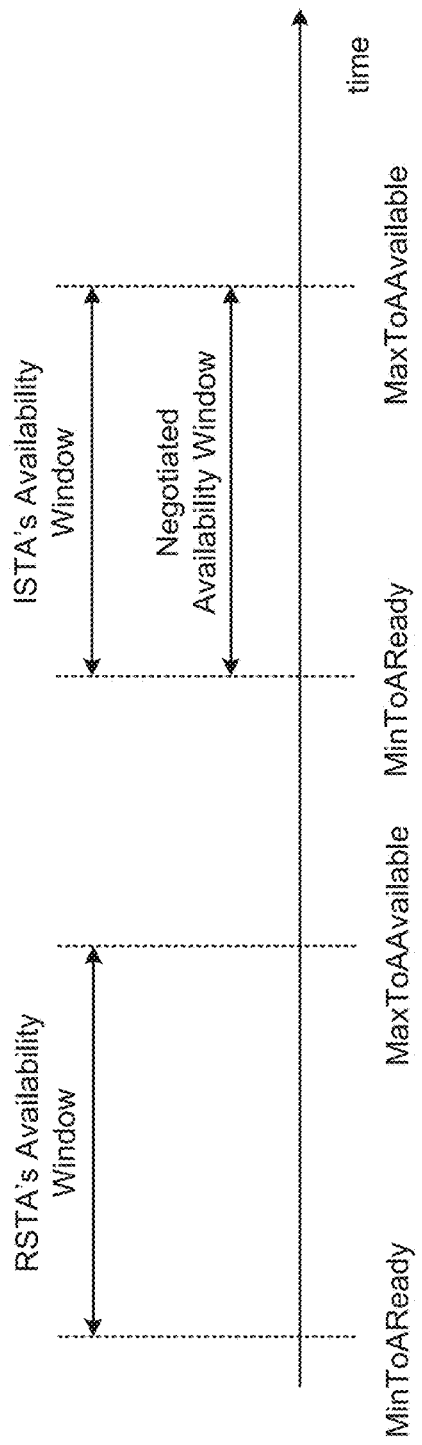
FIGS. 10A-10D depict illustrative schematic diagrams for determining a negotiated availability window, in accordance with one or more example embodiments of the present disclosure.

Referring to FIG. 10A, a scenario is shown in which a responding device's LMR availability window occurs before an initiating device's LMR availability window without overlapping. The responding device's LMR availability window may be defined by a minimum time of arrival (TOA) ready time (e.g., the minimum TOA ready time is also referred to herein as MinToAReady) and by a maximum TOA available time (e.g., the maximum TOA available time is also referred to herein as MaxToAAvailable). Note that MinToAReady occurs before MaxToAAvailable. Similarly, the initiating device's LMR availability window may be defined by a minimum time of arrival (TOA) ready time (e.g., the minimum TOA ready time is also referred to herein as MinToAReady) and by a maximum TOA available time (e.g., the maximum TOA available time is also referred to herein as MaxToAAvailable). In other words, an LMR availability window has a start time that is MinToAReady and an end time that is MaxToAAvailable specific to each device. The MinToAReady time indicates an earliest time that a LMR feedback report frame is ready for transmission to another device. For example, the LMR feedback report may not be determined prior to the MinToAReady time. The MaxToAAvailable time indicates a latest time that the LMR feedback frame can be sent to another device. For example, the LMR feedback report may be stored in a memory of the device (e.g., in a buffer) for only a certain amount of time before the resources of the memory have to be released (e.g., MaxToAAvailable is the latest time the LMR feedback report is stored in the memory. In the scenario illustrated in FIG. 10A, the responding device will determine that the negotiated LMR availability window will be equal to the initiating device's availability window. In other words, the original values of the MinToAReady time and of the MaxToAAvailable time for the responding device may be modified in order to align with the values of the MinToAReady time and of the MaxToAAvailable time of the initiating device.

Figure 10B:
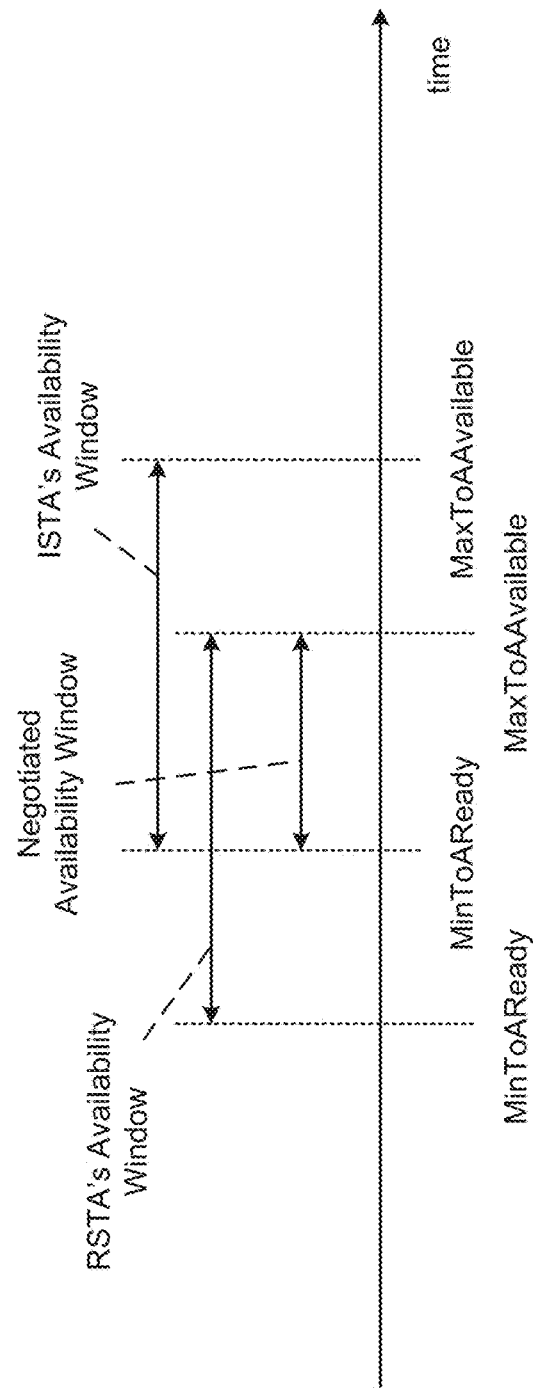

Referring to FIG. 10B, a scenario is shown in which a responding device's LMR availability window occurs before an initiating device's LMR availability window, but the respective windows overlap. In the scenario illustrated in FIG. 10B, the responding device will determine that the negotiated LMR availability window will be equal to the initiating device's MinToAReady time and the responding device's MaxToAAvailable time. In other words, the original value of the MinToAReady time of the responding device and the original value of the MaxToAAvailable time of the initiating device may be modified in order to align with the values of the negotiated LMR availability window. Note that the responding device may determine whether a duration of the negotiated LMR availability meets and/or exceeds a minimum threshold. For example, the minimum threshold may be large enough to accommodate one or more frames. If the negotiated LMR feedback window falls below the minimum threshold, the end time of the negotiated LMR availability window may be extended in order to meet or exceed the minimum threshold.

Figure 10C:
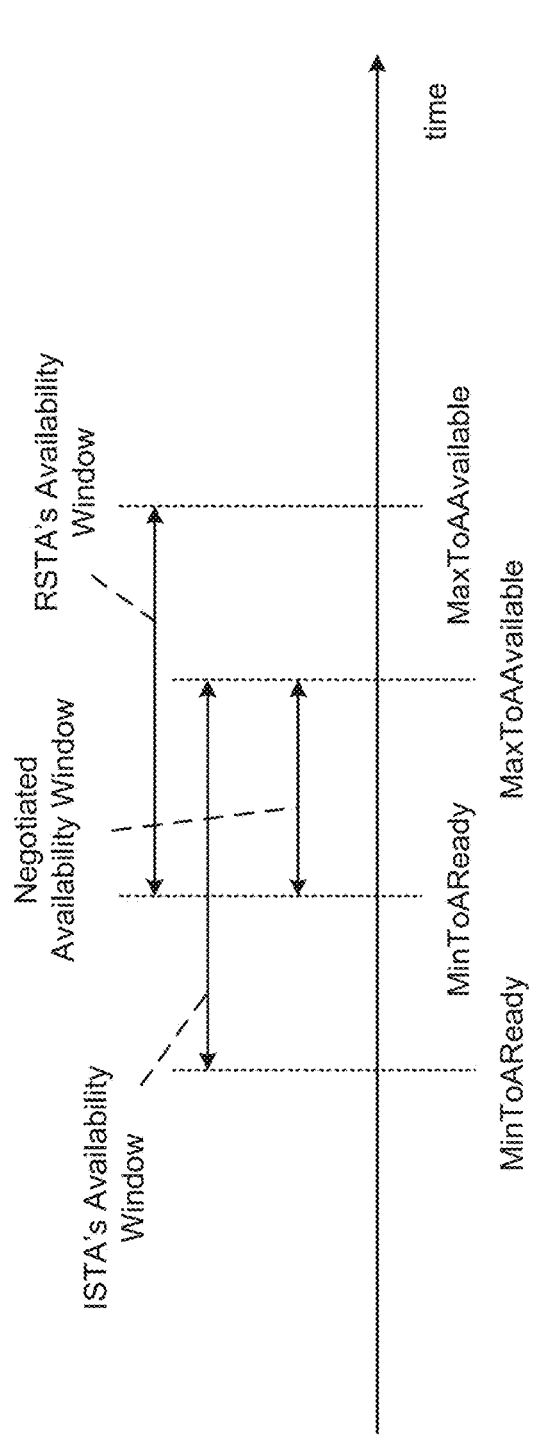

Referring to FIG. 10C, a scenario is shown in which an initiating device's LMR availability window occurs before a responding device's LMR availability window, but the respective windows overlap. In the scenario illustrated in FIG. 10C, the responding device will determine that the negotiated LMR availability window will be equal to the responding device's MinToAReady time and the initiating device's MaxToAAvailable time. In other words, the original value of the MinToAReady time of the initiating device and the original value of the MaxToAAvailable time of the responding device may be modified in order to align with the values of the negotiated LMR availability window. Note that the responding device may determine whether a duration of the negotiated LMR availability meets and/or exceeds a minimum threshold. For example, the minimum threshold may be large enough to accommodate one or more frames. If the negotiated LMR feedback window falls below the minimum threshold, the end time of the negotiated LMR availability window may be extended in order to meet or exceed the minimum threshold.

Figure 10D:
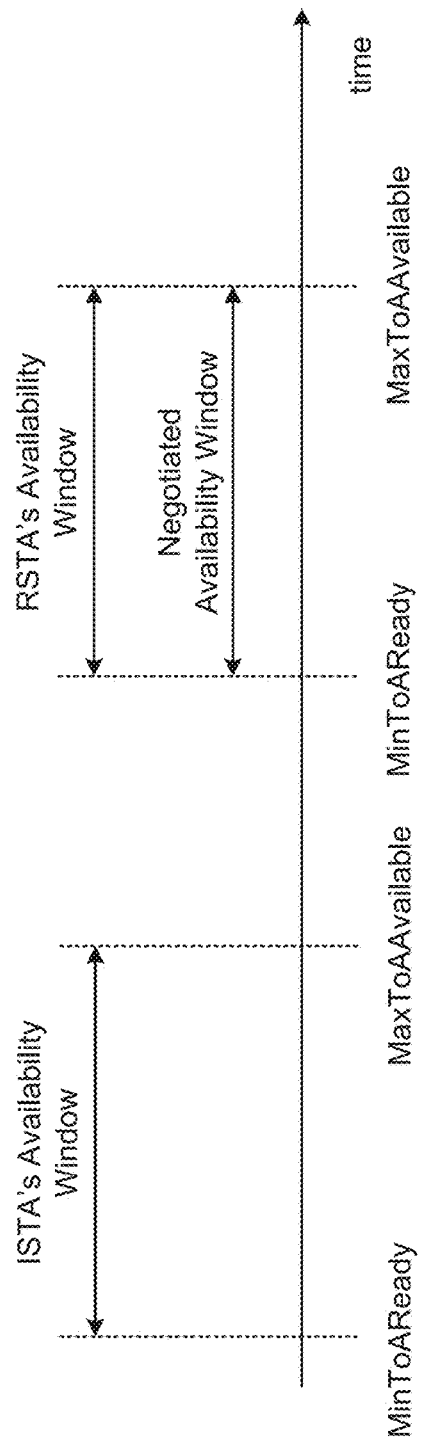

Referring to FIG. 10D, a scenario is shown in which an initiating device's LMR availability window occurs before a responding device's LMR availability window without overlapping. In the scenario illustrated in FIG. 10D, the responding device will determine that the negotiated LMR availability window will be equal to the responding device's MinToAReady time and the responding device's MaxToAAvailable time (e.g., equal to the responding device's LMR availability window). In other words, the original value of the MinToAReady time of the initiating device and the original value of the MaxToAAvailable time of the initiating device may be modified in order to align with the values of the negotiated LMR availability window.

After the initiating devices receives the FTM response frame from the responding device, if the initiating device agrees with the responding device's negotiated availability window, the initiating device should start the following round measurement sequence according to the negotiated availability window. If the initiating device disagrees with the negotiated availability window, then the initiating device may start a new negotiation phase and may send a new FTM request to the responding device, which may include new availability window information.

In one embodiment, for case 1 and for case 4 (e.g., shown in FIG. 10A and FIG. 10D, respectively), the responding device or initiating device may be required to extend the MaxtoAAvailable boundary to accommodate the negotiated availability window, and this will increase the length of period for buffering the ToA information.

In one embodiment, the initiating device and responding device may be requested to support the same feedback types in the RSTA-to-ISTA LMR and ISTA-to-RSTA LMR. For example, to limit the number of different measurement sequences and simplify the design, if either the initiating device or the responding device provides delayed LMR feedback, then both the initiating device and the responding device should provide the delayed LMR feedback. For the single-sided LMR feedback, the LMR feedback type field in the FTM response frame may indicate the LMR type for the RSTA-to-ISTA LMR and for the two-sided LMR feedback, the LMR feedback type field in the FTM response frame may indicate the LMR type for both the RSTA-to-ISTA feedback and the ISTA-to-RSTA feedback.

In one embodiment, when both of the RSTA-to-ISTA feedback and the ISTA-to-RSTA feedback are immediate, the LMR type in FTM response will be immediate. Otherwise, the LMR type in the FTM response may be delayed and the negotiated availability window in the FTM response frame may be used by the initiating device to initiate a following round measurement sequence for the delayed two-sided LMR exchange. Under this responding rule, the initiating device and the responding device only need to support the two cases illustrated in FIGS. 11A-11B.

Figure 11A:
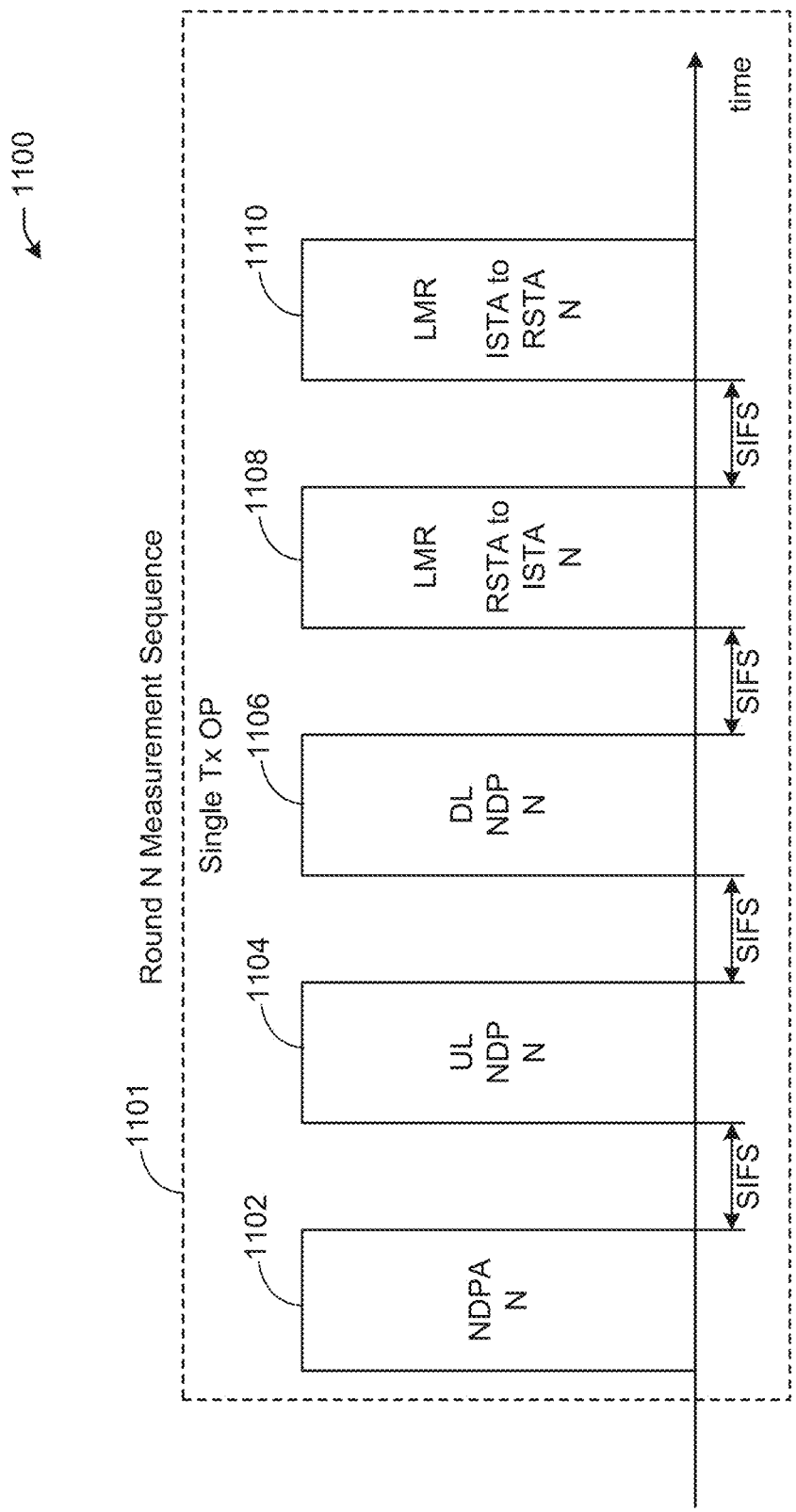
FIGS. 11A-11B depict illustrative schematic diagrams for bidirectional LMR feedback sequences, in accordance with one or more example embodiments of the present disclosure.

In one embodiment, as shown in FIG. 11A, both the initiating device and the responding device provide immediate LMR feedback. In the current round measurement sequence 1101, the initiating device and the responding device will exchange the LMR feedback 1108 and 1110 for the uplink and downlink NDP (e.g., NDPA frame 1102, UL NDP frame 1104, and DL NDP frame 1106) in the current round channel sounding.

Figure 11B:
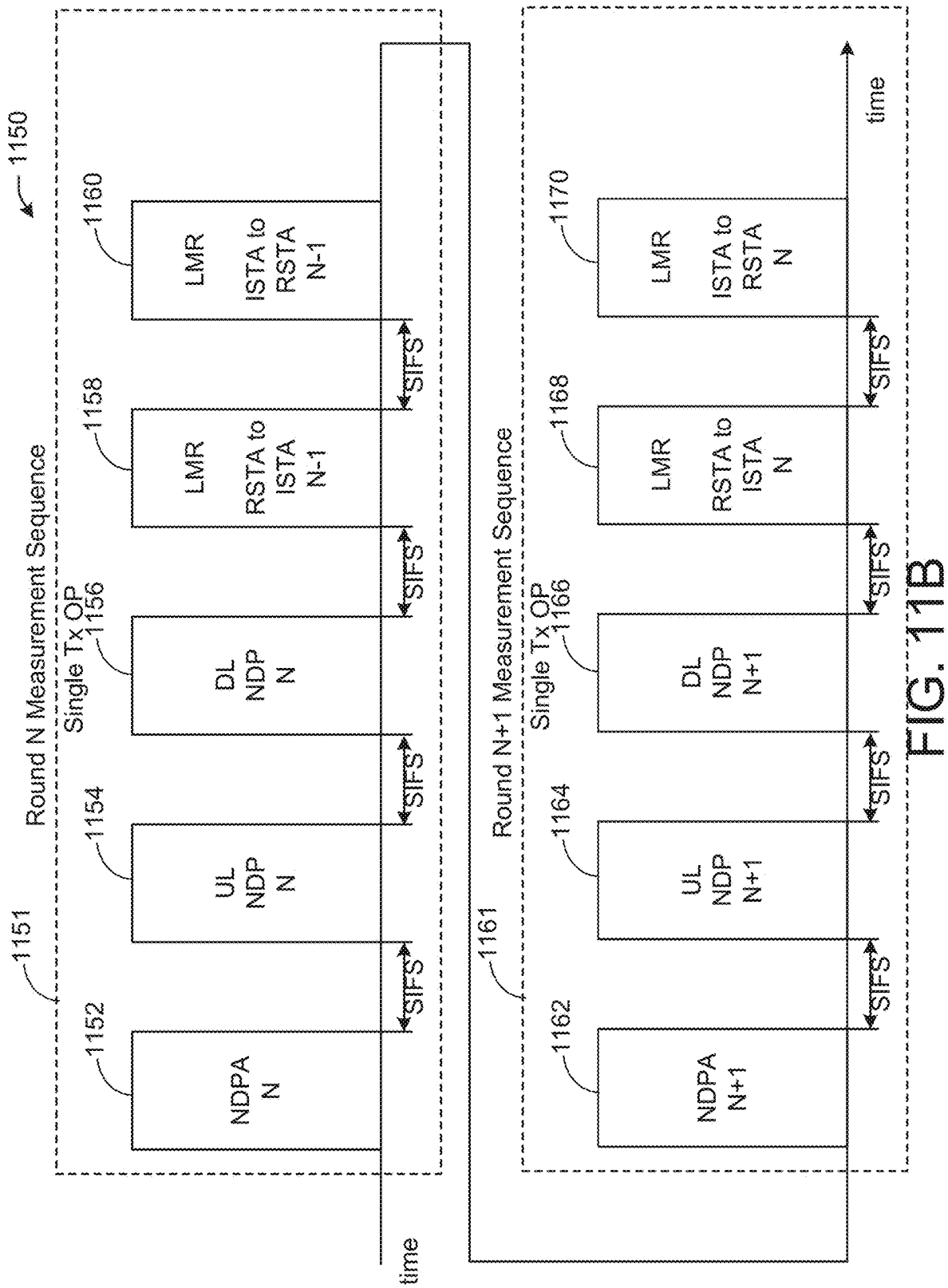

In one embodiment, as shown in FIG. 11B, at least one of the initiating device or the responding device provides delayed LMR feedback. Even though the responding device can provide the immediate LMR feedback (t2 and t3) to the initiating device, the initiating device cannot obtain the range estimation immediately (e.g., because the initiating device's range estimation calculation also needs the initiating device's LMR information, t1 and t4). In other words, before the initiating device's LMR is ready, the initiating device cannot obtain the range estimation. Therefore, when the responding device can send immediate feedback and the initiating device can send delayed feedback, forcing the responding device to send the delayed LMR feedback will not impact the latency of the initiating device's or responding device's range estimations. For this case, the negotiated availability window in the responding device's FTM response frame can be determined for the following three cases. First, the responding device provides immediate LMR feedback and the initiating device provides delayed LMR feedback. In such a scenario, the negotiated availability window should align with the initiating device's availability window. Second, the initiating device provides immediate LMR feedback and the responding device provides delayed LMR feedback. In such a scenario, the negotiated availability window should align with responding device's availability window. Third, both the initiating device and the responding device can provide delayed LMR feedback. In such a scenario, the negotiated availability window can be determined using the methods described in FIGS. 10A-10D.

The responding rules described above can also be applied to the MU scenario, and for MU scenario, in each availability window, the initiating device and the responding device can exchange the two-sided LMR according to the proposed responding rules. For example, if either the initiating device or the responding device only supports delayed LMR feedback, then both of the initiating device or the responding device should support the delayed LMR. The immediate two-sided LMR feedback is supported only when both of the initiating device and the responding device can support the immediate LMR feedback.

It is understood that the above descriptions are for purposes of illustration and are not meant to be limiting.

Figure 12:
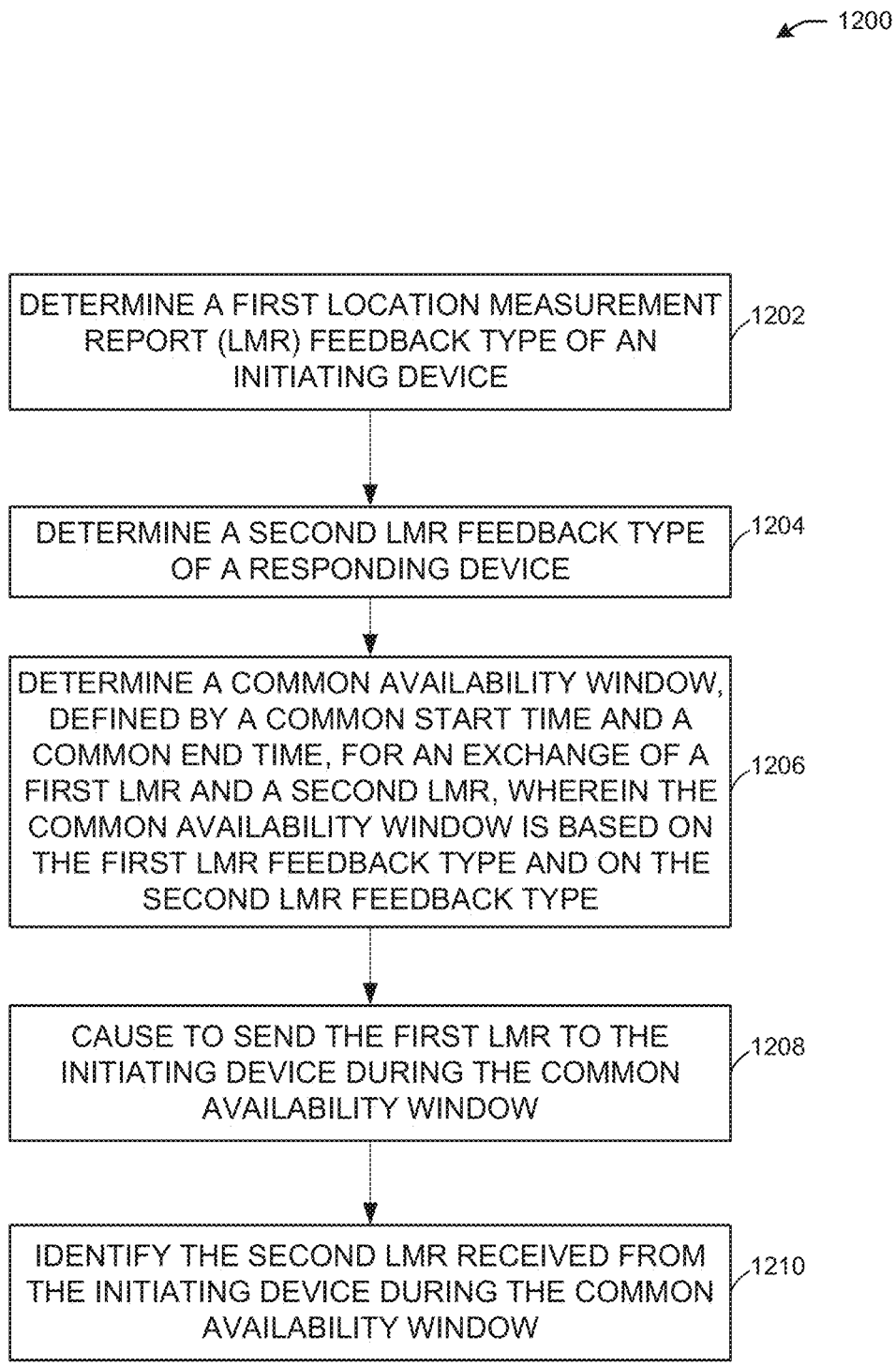
FIG. 12 depicts a flow diagram of illustrative process for a bidirectional LMR feedback system, in accordance with one or more embodiments of the disclosure.

FIG. 12 illustrates a flow diagram of illustrative process 1200 for an illustrative bidirectional LMR feedback system, in accordance with one or more example embodiments of the present disclosure.

At block 1202, a responding device (e.g., the user device(s) 120 and/or the AP 102 of FIG. 1) may determine a first location measurement report (LMR) feedback type of an initiating device. The first LMR feedback type may be a delayed feedback type. The first LMR feedback type may be an immediate feedback type. The responding device may further comprise a transceiver configured to transmit and receive wireless signals. The responding device may further comprise an antenna coupled to the transceiver.

At block 1204, the responding device may determine a second LMR feedback type of the responding device. The second LMR feedback type may be a delayed feedback type. The second LMR feedback type may be an immediate feedback type.

At block 1206, the responding device may determine a common availability window, defined by a common start time and a common end time, for an exchange of a first LMR and a second LMR, wherein the common availability window may be based on the first LMR feedback type and on the second LMR feedback type. The responding device may identify an indication of a first availability window of the initiating device received from the initiating device, wherein the first availability window may be defined by a first start time and a first end time. The responding device may determine a second availability window of the responding device, wherein the second availability window may be defined by a second start time and a second end time. The common availability window may be determined based on the first availability window and on the second availability window. The common start time may be defined by the later time of the first start time and the second start time. The common end time may be defined by the later time of the first end time and the second end time. To determine the common availability window, the responding device may determine a minimum length of the common availability window; and determine the common end time based on the minimum length of the common availability window. An indication of the common availability window may be exchanged during a negotiation phase between the initiating device and the responding device.

At block 1208, the responding device may cause to send the first LMR to the initiating device during the common availability window. The first LMR may be exchanged during a first measurement sequence.

At block 1210, the responding device may identify the second LMR received from the initiating device during the common availability window. The second LMR may be exchanged during the first measurement sequence. The responding device may determine an interval between the first measurement sequence and a second measurement sequence, wherein the interval may be within the common availability window.

It is understood that the above descriptions are for purposes of illustration and are not meant to be limiting.

FIG. 13 shows a functional diagram of an exemplary communication station 1300 in accordance with some embodiments. In one embodiment, FIG. 13 illustrates a functional block diagram of a communication station that may be suitable for use as an AP 102 (FIG. 1) or a user device 120 (FIG. 1) in accordance with some embodiments. The communication station 1300 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1300 may include communications circuitry 1302 and a transceiver 1310 for transmitting and receiving signals to and from other communication stations using one or more antennas 1301. The communications circuitry 1302 may include circuitry that can operate physical layer communications and/or media access control (MAC) communications for controlling access to the wireless medium, and/or any other communications layers for transmitting and receiving signals. The communication station 1300 may also include processing circuitry 1306 and memory 1308 arranged to perform the operations described herein. In some embodiments, the communications circuitry 1302 and the processing circuitry 1306 may be configured to perform operations detailed in FIGS. 1-12.

In accordance with some embodiments, the communications circuitry 1302 may be arranged to contend for a wireless medium and configure frames or packets for communicating over the wireless medium. The communications circuitry 1302 may be arranged to transmit and receive signals. The communications circuitry 1302 may also include circuitry for modulation/demodulation, upconversion/downconversion, filtering, amplification, etc. In some embodiments, the processing circuitry 1306 of the communication station 1300 may include one or more processors. In other embodiments, two or more antennas 1301 may be coupled to the communications circuitry 1302 arranged for sending and receiving signals. The memory 1308 may store information for configuring the processing circuitry 1306 to perform operations for configuring and transmitting message frames and performing the various operations described herein. The memory 1308 may include any type of memory, including non-transitory memory, for storing information in a form readable by a machine (e.g., a computer). For example, the memory 1308 may include a computer-readable storage device, read-only memory (ROM), random-access memory (RAM), magnetic disk storage media, optical storage media, flash-memory devices and other storage devices and media.

In some embodiments, the communication station 1300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1300 may include one or more antennas 1301. The antennas 1301 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1300 may include one or more of a keyboard, a display, a non-volatile memory port, multiple antennas, a graphics processor, an application processor, speakers, and other mobile device elements. The display may be an LCD screen including a touch screen.

Although the communication station 1300 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1300 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1300 may include one or more processors and may be configured with instructions stored on a computer-readable storage device.

FIG. 14 illustrates a block diagram of an example of a machine 1400 or system upon which any one or more of the techniques (e.g., methodologies) discussed herein may be performed. In other embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environments. The machine 1400 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The machine 1400 may further include a power management device 1432, a graphics display device 1410, an alphanumeric input device 1412 (e.g., a keyboard), and a user interface (UI) navigation device 1414 (e.g., a mouse). In an example, the graphics display device 1410, alphanumeric input device 1412, and UI navigation device 1414 may be a touch screen display. The machine 1400 may additionally include a storage device (i.e., drive unit) 1416, a signal generation device 1418 (e.g., a speaker), a bidirectional LMR feedback device 1419, a network interface device/transceiver 1420 coupled to antenna(s) 1430, and one or more sensors 1428, such as a global positioning system (GPS) sensor, a compass, an accelerometer, or other sensor. The machine 1400 may include an output controller 1434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1402 for generation and processing of the baseband signals and for controlling operations of the main memory

1404, the storage device 1416, and/or the bidirectional LMR feedback device 1419. The baseband processor may be provided on a single radio card, a single chip, or an integrated circuit (IC).

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within the static memory 1406, or within the hardware processor 1402 during execution thereof by the machine 1400. In an example, one or any combination of the hardware processor 1402, the main memory 1404, the static memory 1406, or the storage device 1416 may constitute machine-readable media.

The bidirectional LMR feedback device 1419 may enable a two-sided LMR feedback between initiating and responding. The bidirectional LMR feedback device 1419 may determine that both the initiating device and the responding device provide immediate LMR feedback.

The bidirectional LMR feedback device 1419 may determine to initiate a bidirectional LMR feedback sequence. A current bidirectional LMR feedback sequence may be one of N bidirectional LMR feedback sequences, wherein N is a positive integer. The initiating device may send an NDPA frame to the responding device. The NDPA frame may announce to the responding device the beginning of a bidirectional LMR measurement sequence.

The bidirectional LMR feedback device 1419 may send an UL NDP frame a SIFS after the initiating device has sent the NDPA frame. The bidirectional LMR feedback device 1419 may determine a time of departure of the UL NDP frame (e.g., the time of departure of the UL NDP frame is also referred to herein as t1).

The bidirectional LMR feedback device 1419 may receive the NDPA frame from the initiating device. The bidirectional LMR feedback device 1419 may determine, in response to receipt of the NDPA frame, that an initiating device has begun an LMR measurement sequence. The bidirectional LMR feedback device 1419 may receive the UL NDP frame from the initiating device. The bidirectional LMR feedback device 1419 may determine a time of arrival of the UL NDP frame (e.g., the time of arrival of the UL NDP frame is also referred to herein as t2).

The bidirectional LMR feedback device 1419 may send a DL NDP frame to the initiating device. The bidirectional LMR feedback device 1419 may send the DL NDP frame to the initiating device after a SIFS after arrival of the UL NDP frame. The bidirectional LMR feedback device 1419 may determine a time of departure of the DL NDP frame (e.g., the time of departure of the DL NDP frame is also referred to herein as t3).

The bidirectional LMR feedback device 1419 may send an RSTA-to-ISTA LMR feedback frame for the round N measurement sequence to the initiating device. The bidirectional LMR feedback device 1419 may send the RSTA-to-ISTA LMR feedback frame for the round N measurement sequence to the responding device after a SIFS after sending the DL NDP frame. The RSTA-to-ISTA LMR feedback frame for the round N measurement sequence may include the time of arrival of the UL NDP frame (e.g., t2) and the time of departure of the DL NDP frame (e.g., t3).

The bidirectional LMR feedback device 1419 may receive the DL NDP frame from the responding device. The bidirectional LMR feedback device 1419 may determine a time of arrival of the DL NDP frame (e.g., the time of arrival of the DL NDP frame is also referred to herein as t4). The bidirectional LMR feedback device 1419 may receive the RSTA-to-ISTA LMR feedback frame for the round N measurement sequence from the responding device. As noted above, the RSTA-to-ISTA LMR feedback frame for the round N measurement sequence may include the time of arrival of the UL NDP frame (e.g., t2) and the time of departure of the DL NDP frame (e.g., t3). Using the information in the LMR feedback frame for the round N measurement sequence (e.g., using t2 and t3) and the information determined by the initiating device (e.g., t1 and t4), the bidirectional LMR feedback device 1419 may determine a range of the responding device and/or a range of the initiating device.

The bidirectional LMR feedback device 1419 may send an ISTA-to-RSTA LMR feedback frame for the round N measurement sequence to the responding device. The bidirectional LMR feedback device 1419 may send the ISTA-to-RSTA LMR feedback frame for the round N measurement sequence to the responding device after a SIFS after receiving the RSTA-to-ISTA LMR feedback frame for the round N measurement sequence. The ISTA-to-RSTA LMR feedback frame for the round N measurement sequence may include the time of departure of the UL NDP frame (e.g., t1) and the time of arrival of the DL NDP frame (e.g., t4).

The bidirectional LMR feedback device 1419 may receive the ISTA-to-RSTA LMR feedback frame for the round N measurement sequence from the initiating device. As noted above, the ISTA-to-RSTA LMR feedback frame for the round N measurement sequence may include the time of departure of the UL NDP frame (e.g., t1) and the time of arrival of the DL NDP frame (e.g., t4). Using the information in the ISTA-to-RSTA LMR feedback frame for the round N measurement sequence (e.g., using t1 and t4) and the information determined by the responding device (e.g., t2 and t3), the bidirectional LMR feedback device 1419 may determine a range of the responding device and/or a range of the initiating device.

The bidirectional LMR feedback device 1419 may determine that the initiating device may provide delayed LMR feedback and the responding device may provide immediate LMR feedback.

The bidirectional LMR feedback device 1419 may determine to initiate a bidirectional LMR feedback sequence. The current bidirectional LMR feedback sequence may be one of N bidirectional LMR feedback sequences, wherein N is a positive integer. The bidirectional LMR feedback device 1419 may send an NDPA frame to the responding device. The NDPA frame may announce to the responding device the beginning of a bidirectional LMR measurement sequence.

The bidirectional LMR feedback device 1419 may send an UL NDP frame a SIFS after the initiating device has sent the NDPA frame. The bidirectional LMR feedback device 1419 may determine a time of departure of the UL NDP frame (e.g., the time of departure of the UL NDP frame is also referred to herein as 0).

The bidirectional LMR feedback device 1419 may receive the NDPA frame from the initiating device. The bidirectional LMR feedback device 1419 may determine, in response to receipt of the NDPA frame, that an initiating device has begun an LMR measurement sequence.

The bidirectional LMR feedback device 1419 may receive the UL NDP frame from the initiating device. The bidirectional LMR feedback device 1419 may determine a time of arrival of the UL NDP frame (e.g., the time of arrival of the UL NDP frame is also referred to herein as t2).

The bidirectional LMR feedback device 1419 may send a DL NDP frame to the initiating device. The bidirectional LMR feedback device 1419 may send the DL NDP frame to the initiating device after a SIFS after arrival of the UL NDP frame. The bidirectional LMR feedback device 1419 may determine a time of departure of the DL NDP frame (e.g., the time of departure of the DL NDP frame is also referred to herein as t3).

The bidirectional LMR feedback device 1419 may send an RSTA-to-ISTA LMR feedback frame for the round N measurement sequence to the initiating device. The bidirectional LMR feedback device 1419 may send the RSTA-to-ISTA LMR feedback frame for the round N measurement sequence to the responding device after a SIFS after sending the DL NDP frame. The RSTA-to-ISTA LMR feedback frame for the round N measurement sequence may include the time of arrival of the UL NDP frame (e.g., t2) and the time of departure of the DL NDP frame (e.g., t3).

The bidirectional LMR feedback device 1419 may receive the DL NDP frame from the responding device. The bidirectional LMR feedback device 1419 may determine a time of arrival of the DL NDP frame (e.g., the time of arrival of the DL NDP frame is also referred to herein as t4).

The bidirectional LMR feedback device 1419 may receive the RSTA-to-ISTA LMR feedback frame for the round N measurement sequence from the responding device. As noted above, the RSTA-to-ISTA LMR feedback frame for the round N measurement sequence may include the time of arrival of the UL NDP frame (e.g., t2) and the time of departure of the DL NDP frame (e.g., t3). Using the information in the LMR feedback frame for the round N measurement sequence (e.g., using t2 and t3) and the information determined by the initiating device (e.g., t1 and t4), the bidirectional LMR feedback device 1419 may determine a range of the responding device and/or a range of the initiating device.

The bidirectional LMR feedback device 1419 may send an ISTA-to-RSTA LMR feedback frame for the round N−1 measurement sequence to the responding device. The bidirectional LMR feedback device 1419 may send the ISTA-to-RSTA LMR feedback frame for the round N−1 measurement sequence to the responding device after a SIFS after receiving the RSTA-to-ISTA LMR feedback frame for the round N measurement sequence. The ISTA-to-RSTA LMR feedback frame for the round N−1 measurement sequence may include the time of departure of the UL NDP frame (e.g., t1) and the time of arrival of the DL NDP frame (e.g., t4). Note that for N equal to 1, the ISTA-to-RSTA LMR feedback frame for the round N−1 measurement sequence may include dummy values for the ToA and ToD values (e.g., for t1 and t4).

The bidirectional LMR feedback device 1419 may receive the ISTA-to-RSTA LMR feedback frame for the round N−1 measurement sequence from the initiating device. As noted above, the ISTA-to-RSTA LMR feedback frame for the round N−1 measurement sequence may include the time of departure of the UL NDP frame (e.g., t1) and the time of arrival of the DL NDP frame (e.g., t4). Using the information in the ISTA-to-RSTA LMR feedback frame for the round N−1 measurement sequence (e.g., using t1 and t4) and the information determined by the responding device (e.g., t2 and t3), the bidirectional LMR feedback device 1419 may determine a range of the responding device and/or a range of the initiating device.

After the current round of measurement sequence (e.g., after round N) is completed, the bidirectional LMR feedback device 1419 may start a following round of measurement sequence (e.g., round N+1) to send the delayed LMR feedback (ISTA-to-RSTA for the round N measurement sequence) to the responding device. In other words, the bidirectional LMR feedback device 1419 may start the round of measurement sequence that includes the exchange of an NDPA frame, an UL NDP frame, a DL NDP frame, the RSTA-to-ISTA LMR feedback frame for the round N+1 measurement sequence, and the ISTA-to-RSTA LMR feedback frame for the round N measurement sequence. A time interval T between the round N and round N+1 measurement sequences may be controlled by the bidirectional LMR feedback device 1419 such that a value of T should be within the initiating device's time of arrival availability window (e.g., within MinToAReady and MaxToAAvailable).

The bidirectional LMR feedback device 1419 may determine that the initiating device may provide immediate LMR feedback and the responding device may provide delayed LMR feedback.

The bidirectional LMR feedback device 1419 may determine to initiate a bidirectional LMR feedback sequence. The current bidirectional LMR feedback sequence may be one of N bidirectional LMR feedback sequences, wherein N is a positive integer. The bidirectional LMR feedback device 1419 may send an NDPA frame to the responding device. The NDPA frame may announce to the responding device the beginning of a bidirectional LMR measurement sequence.

The bidirectional LMR feedback device 1419 may send an UL NDP frame a SIFS after the initiating device has sent the NDPA frame. The bidirectional LMR feedback device 1419 may determine a time of departure of the UL NDP frame (e.g., the time of departure of the UL NDP frame is also referred to herein as t1).

The bidirectional LMR feedback device 1419 may receive the NDPA frame from the initiating device. The bidirectional LMR feedback device 1419 may determine, in response to receipt of the NDPA frame, that an initiating device has begun an LMR measurement sequence.

The bidirectional LMR feedback device 1419 may receive the UL NDP frame from the initiating device. The bidirectional LMR feedback device 1419 may determine a time of arrival of the UL NDP frame (e.g., the time of arrival of the UL NDP frame is also referred to herein as t2).

The bidirectional LMR feedback device 1419 may send a DL NDP frame to the initiating device. The bidirectional LMR feedback device 1419 may send the DL NDP frame to the initiating device after a SIFS after arrival of the UL NDP frame. The bidirectional LMR feedback device 1419 may determine a time of departure of the DL NDP frame (e.g., the time of departure of the DL NDP frame is also referred to herein as t3).

The bidirectional LMR feedback device 1419 may send an RSTA-to-ISTA LMR feedback frame for the round N−1 measurement sequence to the initiating device. The bidirectional LMR feedback device 1419 may send the RSTA-to-ISTA LMR feedback frame for the round N−1 measurement sequence to the responding device after a SIFS after sending the DL NDP frame. The RSTA-to-ISTA LMR feedback frame for the round N−1 measurement sequence may include the time of arrival of the UL NDP frame (e.g., t2) and the time of departure of the DL NDP frame (e.g., t3). Note that for N equal to 1, the RSTA-to-ISTA LMR feedback frame for the round N−1 measurement sequence may include dummy values for the ToA and ToD values (e.g., for t2 and t3).

The bidirectional LMR feedback device 1419 may receive the DL NDP frame from the responding device. The bidirectional LMR feedback device 1419 may determine a time of arrival of the DL NDP frame (e.g., the time of arrival of the DL NDP frame is also referred to herein as t4).

The bidirectional LMR feedback device 1419 may receive the RSTA-to-ISTA LMR feedback frame for the round N−1 measurement sequence from the responding device. As noted above, the RSTA-to-ISTA LMR feedback frame for the round N−1 measurement sequence may include the time of arrival of the UL NDP frame (e.g., t2) and the time of departure of the DL NDP frame (e.g., t3). Using the information in the LMR feedback frame for the round N−1 measurement sequence (e.g., using t2 and t3) and the information determined by the initiating device (e.g., t1 and t4), the bidirectional LMR feedback device 1419 may determine a range of the responding device and/or a range of the initiating device.

The bidirectional LMR feedback device 1419 may send an ISTA-to-RSTA LMR feedback frame for the round N measurement sequence to the responding device. The bidirectional LMR feedback device 1419 may send the ISTA-to-RSTA LMR feedback frame for the round N measurement sequence to the responding device after a SIFS after receiving the RSTA-to-ISTA LMR feedback frame for the round N−1 measurement sequence. The ISTA-to-RSTA LMR feedback frame for the round N measurement sequence may include the time of departure of the UL NDP frame (e.g., t1) and the time of arrival of the DL NDP frame (e.g., t4).

The bidirectional LMR feedback device 1419 may receive the ISTA-to-RSTA LMR feedback frame for the round N measurement sequence from the initiating device. As noted above, the ISTA-to-RSTA LMR feedback frame for the round N measurement sequence may include the time of departure of the UL NDP frame (e.g., t1) and the time of arrival of the DL NDP frame (e.g., t4). Using the information in the ISTA-to-RSTA LMR feedback frame for the round N measurement sequence (e.g., using t1 and t4) and the information determined by the responding device (e.g., t2 and t3), the bidirectional LMR feedback device 1419 may determine a range of the responding device and/or a range of the initiating device.

After the current round of measurement sequence (e.g., after round N) is completed, the bidirectional LMR feedback device 1419 may start a following round of measurement sequence (e.g., round N+1) to receive the delayed LMR feedback (RSTA-to-ISTA for the round N measurement sequence) from the initiating device. In other words, the bidirectional LMR feedback device 1419 may start the round of measurement sequence that includes the exchange of an NDPA frame, an UL NDP frame, a DL NDP frame, the RSTA-to-ISTA LMR feedback frame for the round N measurement sequence, and the ISTA-to-RSTA LMR feedback frame for the round N+1 measurement sequence. A time interval T between the round N and round N+1 measurement sequences may be controlled by the bidirectional LMR feedback device 1419 such that a value of T should be within the responding device's time of arrival availability window (e.g., within MinToAReady and MaxToAAvailable).

The bidirectional LMR feedback device 1419 may determine that both the initiating device and the responding device may provide delayed LMR feedback.

The bidirectional LMR feedback device 1419 may determine to initiate a bidirectional LMR feedback sequence. The current bidirectional LMR feedback sequence may be one of N bidirectional LMR feedback sequences, wherein N is a positive integer. The bidirectional LMR feedback device 1419 may send an NDPA frame to the responding device.

The NDPA frame may announce to the responding device the beginning of a bidirectional LMR measurement sequence.

The bidirectional LMR feedback device 1419 may send an UL NDP frame a SIFS after the initiating device has sent the NDPA frame. In other words, the bidirectional LMR feedback device 1419 may send the NDPA frame to the responding device and, after the duration of a SIFS, the initiating device may send the UL NDP frame to the responding device. The bidirectional LMR feedback device 1419 may determine a time of departure of the UL NDP frame (e.g., the time of departure of the UL NDP frame is also referred to herein as t1).

The bidirectional LMR feedback device 1419 may receive the NDPA frame from the initiating device. The bidirectional LMR feedback device 1419 may determine, in response to receipt of the NDPA frame, that an initiating device has begun an LMR measurement sequence.

The bidirectional LMR feedback device 1419 may receive the UL NDP frame from the initiating device. The bidirectional LMR feedback device 1419 may determine a time of arrival of the UL NDP frame (e.g., the time of arrival of the UL NDP frame is also referred to herein as t2).

The bidirectional LMR feedback device 1419 may send a DL NDP frame to the initiating device. The bidirectional LMR feedback device 1419 may send the DL NDP frame to the initiating device after a SIFS after arrival of the UL NDP frame. The bidirectional LMR feedback device 1419 may determine a time of departure of the DL NDP frame (e.g., the time of departure of the DL NDP frame is also referred to herein as t3).

The bidirectional LMR feedback device 1419 may send an RSTA-to-ISTA LMR feedback frame for the round N−1 measurement sequence to the initiating device. The bidirectional LMR feedback device 1419 may send the RSTA-to-ISTA LMR feedback frame for the round N−1 measurement sequence to the responding device after a SIFS after sending the DL NDP frame. The RSTA-to-ISTA LMR feedback frame for the round N−1 measurement sequence may include the time of arrival of the UL NDP frame (e.g., t2) and the time of departure of the DL NDP frame (e.g., t3). Note that for N equal to 1, the RSTA-to-ISTA LMR feedback frame for the round N−1 measurement sequence may include dummy values for the ToA and ToD values (e.g., for t2 and t3).

The bidirectional LMR feedback device 1419 may receive the DL NDP frame from the responding device. The bidirectional LMR feedback device 1419 may determine a time of arrival of the DL NDP frame (e.g., the time of arrival of the DL NDP frame is also referred to herein as t4).

The bidirectional LMR feedback device 1419 may receive the RSTA-to-ISTA LMR feedback frame for the round N−1 measurement sequence from the responding device. As noted above, the RSTA-to-ISTA LMR feedback frame for the round N−1 measurement sequence may include the time of arrival of the UL NDP frame (e.g., t2) and the time of departure of the DL NDP frame (e.g., t3). Using the information in the LMR feedback frame for the round N−1 measurement sequence (e.g., using t2 and t3) and the information determined by the initiating device (e.g., t1 and t4), the bidirectional LMR feedback device 1419 may determine a range of the responding device and/or a range of the initiating device.

The bidirectional LMR feedback device 1419 may send an ISTA-to-RSTA LMR feedback frame for the round N−1 measurement sequence to the responding device. The bidirectional LMR feedback device 1419 may send the ISTAto-RSTA LMR feedback frame for the round N−1 measurement sequence to the responding device after a SIFS after receiving the RSTA-to-ISTA LMR feedback frame for the round N−1 measurement sequence. The ISTA-to-RSTA LMR feedback frame for the round N−1 measurement sequence may include the time of departure of the UL NDP frame (e.g., t1) and the time of arrival of the DL NDP frame (e.g., t4).

The bidirectional LMR feedback device 1419 may receive the ISTA-to-RSTA LMR feedback frame for the round N−1 measurement sequence from the initiating device. As noted above, the ISTA-to-RSTA LMR feedback frame for the round N−1 measurement sequence may include the time of departure of the UL NDP frame (e.g., t1) and the time of arrival of the DL NDP frame (e.g., t4). Using the information in the ISTA-to-RSTA LMR feedback frame for the round N−1 measurement sequence (e.g., using t1 and t4) and the information determined by the responding device (e.g., t2 and t3), the bidirectional LMR feedback device 1419 may determine a range of the responding device and/or a range of the initiating device.

After the current round of measurement sequence (e.g., after round N) is completed, the bidirectional LMR feedback device 1419 may start a following round of measurement sequence (e.g., round N+1) to receive the delayed LMR feedback (RSTA-to-ISTA for the round N−1 measurement sequence and ISTA-to-RSTA for the round N−1 measurement sequence) from the initiating device. In other words, the bidirectional LMR feedback device 1419 may start the round of measurement sequence that includes the exchange of an NDPA frame, an UL NDP frame, a DL NDP frame, the RSTA-to-ISTA LMR feedback frame for the round N measurement sequence, and the ISTA-to-RSTA LMR feedback frame for the round N measurement sequence. A time interval T between the round N and round N+1 measurement sequences may be controlled by the bidirectional LMR feedback device 1419 such that a value of T should be within both the responding device's time of arrival availability window and within the initiating device's time of arrival availability window (e.g., within MinToAReady and MaxToAAvailable), as discussed in greater detail below.

The bidirectional LMR feedback device 1419 and the responding device may exchange the ToA availability information [MinToAReady, MaxToAAvaialble] during the negotiation phase, and the bidirectional LMR feedback device 1419 may use a fine timing measurement (FTM) request frame to send its ToA availability window information to the responding device.

Based on the initiating device's availability window and on the responding device's own availability window, the bidirectional LMR feedback device 1419 may determine a negotiated availability window. The bidirectional LMR feedback device 1419 may use an FTM response frame to send its negotiated ToA availability window information to the initiating device. To achieve an efficient exchange of the two-sided LMR feedback frames, the bidirectional LMR feedback device 1419 should select the negotiated availability window such that both the initiating device's and the responding device's ToA/ToD are available within this window.

The bidirectional LMR feedback device 1419 may determine that a responding device's LMR availability window occurs before an initiating device's LMR availability window without overlapping. The responding device's LMR availability window may be defined by a minimum time of arrival (TOA) ready time (e.g., the minimum TOA ready time is also referred to herein as MinToAReady) and by a maximum TOA available time (e.g., the maximum TOA available time is also referred to herein as MaxToAAvailable).

The bidirectional LMR feedback device 1419 may determine that the negotiated LMR availability window will be equal to the initiating device's availability window. In other words, the original values of the MinToAReady time and of the MaxToAAvailable time for the responding device may be modified in order to align with the values of the MinToAReady time and of the MaxToAAvailable time of the initiating device.

The bidirectional LMR feedback device 1419 may determine that a responding device's LMR availability window occurs before an initiating device's LMR availability window, but the respective windows overlap. The bidirectional LMR feedback device 1419 may determine that the negotiated LMR availability window will be equal to the initiating device's MinToAReady time and the responding device's MaxToAAvailable time. In other words, the original value of the MinToAReady time of the responding device and the original value of the MaxToAAvailable time of the initiating device may be modified in order to align with the values of the negotiated LMR availability window.

The bidirectional LMR feedback device 1419 may determine whether a duration of the negotiated LMR availability meets and/or exceeds a minimum threshold. For example, the minimum threshold may be large enough to accommodate one or more frames. For example, the minimum threshold may be equal to an RSTA-to-ISTA LMR feedback frame plus a SIFS plus an ISTA-to-RSTA LMR feedback frame. If the negotiated LMR feedback window falls below the minimum threshold, the end time of the negotiated LMR availability window may be extended in order to meet or exceed the minimum threshold.

The bidirectional LMR feedback device 1419 may determine that an initiating device's LMR availability window occurs before a responding device's LMR availability window, but the respective windows overlap. The bidirectional LMR feedback device 1419 may determine that the negotiated LMR availability window will be equal to the responding device's MinToAReady time and the initiating device's MaxToAAvailable time. In other words, the original value of the MinToAReady time of the initiating device and the original value of the MaxToAAvailable time of the responding device may be modified in order to align with the values of the negotiated LMR availability window.

The bidirectional LMR feedback device 1419 may determine whether a duration of the negotiated LMR availability meets and/or exceeds a minimum threshold. For example, the minimum threshold may be large enough to accommodate one or more frames. For example, the minimum threshold may be equal to an RSTA-to-ISTA LMR feedback frame plus a SIFS plus an ISTA-to-RSTA LMR feedback frame. If the negotiated LMR feedback window falls below the minimum threshold, the end time of the negotiated LMR availability window may be extended in order to meet or exceed the minimum threshold.

The bidirectional LMR feedback device 1419 may determine that an initiating device's LMR availability window occurs before a responding device's LMR availability window without overlapping. The bidirectional LMR feedback device 1419 may determine that the negotiated LMR availability window will be equal to the responding device's MinToAReady time and the responding device's MaxToAAvailable time (e.g., equal to the responding device's LMR availability window). In other words, the original value of the MinToAReady time of the initiating device and the original value of the MaxToAAvailable time of the initiating device may be modified in order to align with the values of the negotiated LMR availability window.

After the initiating devices receives the FTM response frame from responding device, if the initiating device agrees with the responding device's negotiated availability window, the bidirectional LMR feedback device 1419 may start the following round measurement sequence according to the negotiated availability window. If the initiating device disagrees with the negotiated availability window, then the bidirectional LMR feedback device 1419 may start a new negotiation phase and may send a new FTM request to the responding device, which may include new availability window information.

The bidirectional LMR feedback device 1419 may determine that the responding device or initiating device may have to extend the MaxtoAAvailable boundary to accommodate the negotiated availability window.

The bidirectional LMR feedback device 1419 may request that the initiating device and responding device support the same feedback types in the RSTA-to-ISTA LMR and ISTA-to-RSTA LMR. For example, to limit the number of different measurement sequences and simplify the design, if either the initiating device or the responding device provides delayed LMR feedback, then both the initiating device and the responding device should provide the delayed LMR feedback. For the single-sided LMR feedback, the LMR feedback type field in the FTM response frame may indicate the LMR type for the RSTA-to-ISTA LMR and for the two-sided LMR feedback, the LMR feedback type field in the FTM response frame may indicate the LMR type for both the RSTA-to-ISTA feedback and the ISTA-to-RSTA feedback.

The bidirectional LMR feedback device 1419 may determine that when both of the RSTA-to-ISTA feedback and the ISTA-to-RSTA feedback are immediate, the LMR type in FTM response will be immediate. Otherwise, the LMR type in the FTM response may be delayed and the negotiated availability window in the FTM response frame may be used by the initiating device to initiate a following round measurement sequence for the delayed two-sided LMR exchange. Under this responding rule, the initiating device and the responding device only need to support two cases.

The bidirectional LMR feedback device 1419 may determine that both the initiating device and the responding device provide immediate LMR feedback. In the current round measurement sequence, the initiating device and the responding device will exchange the LMR feedback for the uplink and downlink NDP (e.g., an NDPA frame, an UL NDP frame, and a DL NDP frame) in the current round channel sounding.

The bidirectional LMR feedback device 1419 may determine that at least one of the initiating device or the responding device provides delayed LMR feedback. Even though the responding device can provide the immediate LMR feedback (t2 and t3) to the initiating device, the initiating device cannot obtain the range estimation immediately (e.g., because the initiating device's range estimation calculation also needs the initiating device's LMR information, t1 and t4). In other words, before the initiating device's LMR is ready, the initiating device cannot obtain the range estimation. Therefore, when the responding device can send immediate feedback and the initiating device can send delayed feedback, forcing the responding device to send the delayed LMR feedback will not impact the latency of the initiating device's or responding device's range estimations.

The bidirectional LMR feedback device 1419 may determine that the negotiated availability window in the responding device's FTM response frame can be determined for the following three cases. First, the responding device provides immediate LMR feedback and the initiating device provides delayed LMR feedback. In such a scenario, the negotiated availability window should align with the initiating device's availability window. Second, the initiating device provides immediate LMR feedback and the responding device provides delayed LMR feedback. In such a scenario, the negotiated availability window should align with the responding device's availability window. Third, both the initiating device and the responding device can provide delayed LMR feedback.

The bidirectional LMR feedback device 1419 may determine that the responding rules described above can also be applied to the MU scenario, and for MU scenario, in each availability window, the initiating device and the responding device can exchange the two-sided LMR according to the proposed responding rules. For example, if either the initiating device or the responding device only supports delayed LMR feedback, then both of the initiating device or the responding device should support the delayed LMR. The immediate two-sided LMR feedback is supported only when both of the initiating device and the responding device can support the immediate LMR feedback.

The bidirectional LMR feedback device 1419 may carry out or perform any of the operations and processes (e.g., process 1200) described and shown above.

It is understood that the above are only a subset of what the bidirectional LMR feedback device 1419 may be configured to perform and that other functions included throughout this disclosure may also be performed by the bidirectional LMR feedback device 1419.

While the machine-readable medium 1422 is illustrated as a single medium, the term "machine-readable medium" may include a single medium or multiple media (e.g., a centralized or distributed database, and/or associated caches and servers) configured to store the one or more instructions 1424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1400 and that cause the machine 1400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1424 may further be transmitted or received over a communications network 1426 using a transmission medium via the network interface device/transceiver 1420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1420 may include one or more physical jacks (e.g., Ethernet, coaxial, or phone jacks) or one or more antennas to connect to the communications network 1426. In an example, the network interface device/transceiver 1420 may include a plurality of antennas to wirelessly communicate using at least one of single-input multiple-output (SIMO), multiple-input, multiple-output (MIMO), or multiple-input single-output (MISO) techniques. The term "transmission medium" shall be taken to include any intangible medium that is capable of storing, encoding, or carrying instructions for execution by the machine 1400 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may include a responding device, the responding device comprising processing circuitry coupled to storage, the processing circuitry configured to: determine a first location measurement report (LMR) feedback type of an initiating device; determine a second LMR feedback type of the responding device; determine a common availability window, defined by a common start time and a common end time, for an exchange of a first LMR and a second LMR, wherein the common availability window is based on the first LMR feedback type and on the second LMR feedback type; cause to send the first LMR to the initiating device during the common availability window; and identify the second LMR received from the initiating device during the common availability window.

Example 2 may include the responding device of claim 1 and/or some other example herein, wherein the processing circuitry is further configured to: determine that the first LMR feedback type is delayed feedback; identify an indication of a first availability window associated with the first LMR of the initiating device received from the initiating device, wherein the first availability window is defined by a first start time and a first end time; determine that the second LMR feedback type is delayed feedback; and determine a second availability window associated with the second LMR of the responding device, wherein the second availability window is defined by a second start time and a second end time.

Example 3 may include the responding device of claim 2 and/or some other example herein, wherein the common availability window is determined based on the first availability window and on the second availability window.

Example 4 may include the responding device of claim 1 and/or some other example herein, wherein to determine the common availability window, the processing circuitry is further configured to: determine a minimum length of the common availability window; and determine the common end time based on the minimum length of the common availability window.

Example 5 may include the responding device of claim 1 and/or some other example herein, wherein the first LMR and the second LMR are exchanged during a first measurement sequence, and wherein the processing circuitry is further configured to: identify an indication of an interval between the first measurement sequence and a second measurement sequence received from the initiating device, wherein the interval is within the common availability window.

Example 6 may include the responding device of claim 1 and/or some other example herein, wherein an indication of the common availability window is exchanged during a negotiation phase between the initiating device and the responding device.

Example 7 may include the responding device of claim 2 and/or some other example herein, wherein the indication of the first availability window is exchanged during a negotiation phase between the initiating device and the responding device.

Example 8 may include the responding device of claim 1 and/or some other example herein, wherein the common availability window is determined based on information included in an indication of the first LMR feedback type and an indication of the second LMR feedback type.

Example 9 may include the responding device of claim 1 and/or some other example herein, further comprising a transceiver configured to transmit and receive wireless signals, wherein the wireless signals are associated with the first LMR and the second LMR.

Example 10 may include the responding device of claim 9 and/or some other example herein, further comprising an antenna coupled to the transceiver.

Example 11 may include a non-transitory computer-readable medium storing computer-executable instructions which when executed by one or more processors of a responding device result in performing operations comprising: determining a first location measurement report (LMR) feedback type of an initiating device; determining a second LMR feedback type of the responding device; determining a common availability window, defined by a common start time and a common end time, for an exchange of a first LMR and a second LMR, wherein the common availability window is based on the first LMR feedback type and on the second LMR feedback type; causing to send the first LMR to the initiating device during the common availability window; and identifying the second LMR received from the initiating device during the common availability window.

Example 12 may include the non-transitory computer-readable medium of claim 11 and/or some other example herein, wherein the operations further comprise: determining that the first LMR feedback type is delayed feedback; identifying an indication of a first availability window associated with the first LMR of the initiating device received from the initiating device, wherein the first availability window is defined by a first start time and a first end time; determining that the second LMR feedback type is delayed feedback; and determining a second availability window associated with the second LMR of the responding device, wherein the second availability window is defined by a second start time and a second end time.

Example 13 may include the non-transitory computer-readable medium of claim 12 and/or some other example herein, wherein the common availability window is determined based on the first availability window and on the second availability window.

Example 14 may include the non-transitory computer-readable medium of claim 11 and/or some other example herein, wherein to determine the common availability window, the operations further comprise: determining a minimum length of the common availability window; and determining the common end time based on the minimum length of the common availability window.

Example 15 may include the non-transitory computer-readable medium of claim 11 and/or some other example herein, wherein the first LMR and the second LMR are exchanged during a first measurement sequence, and wherein the operations further comprise: identifying an indication of an interval between the first measurement sequence and a second measurement sequence received from the initiating device, wherein the interval is within the common availability window.

Example 16 may include the non-transitory computer-readable medium of claim 11 and/or some other example herein, wherein an indication of the common availability window is exchanged during a negotiation phase between the initiating device and the responding device.

Example 17 may include a method comprising: determining, by one or more processors of a responding device, a first location measurement report (LMR) feedback type of an initiating device; determining, by the one or more processors, a second LMR feedback type of the responding device; determining, by the one or more processors, a common availability window, defined by a common start time and a common end time, for an exchange of a first LMR and a second LMR, wherein the common availability window is based on the first LMR feedback type and on the second LMR feedback type; causing to send, by the one or more processors, the first LMR to the initiating device during the common availability window; and identifying, by the one or more processors, the second LMR received from the initiating device during the common availability window.

Example 18 may include the method of claim 17 and/or some other example herein, wherein the method further comprises: determining, by the one or more processors, that the first LMR feedback type is delayed feedback; identifying, by the one or more processors, an indication of a first availability window associated with the first LMR of the initiating device received from the initiating device, wherein the first availability window is defined by a first start time and a first end time; determining, by the one or more processors, that the second LMR feedback type is delayed feedback; and determining, by the one or more processors, a second availability window associated with the second LMR of the responding device, wherein the second availability window is defined by a second start time and a second end time.

Example 19 may include the method of claim 18 and/or some other example herein, wherein the common availability window is determined based on the first availability window and on the second availability window.

Example 20 may include the method of claim 17 and/or some other example herein, wherein the common start time is defined by the later time of the first start time and the second start time, and wherein the common end time is defined by the later time of the first end time and the second end time.

Example 21 may include an apparatus comprising means for: determining a first location measurement report (LMR) feedback type of an initiating device; determining a second LMR feedback type of a responding device; determining a common availability window, defined by a common start time and a common end time, for an exchange of a first LMR and a second LMR, wherein the common availability window is based on the first LMR feedback type and on the second LMR feedback type; causing to send the first LMR to the initiating device during the common availability window; and identifying the second LMR received from the initiating device during the common availability window.

Example 22 may include the apparatus of example 21 and/or some other example herein, further comprising means for: identifying an indication of a first availability window of the initiating device received from the initiating device, wherein the first availability window is defined by a first start time and a first end time; and determining a second availability window of the responding device, wherein the second availability window is defined by a second start time and a second end time.

Example 23 may include the apparatus of example 22 and/or some other example herein, wherein the common availability window is determined based on the first availability window and on the second availability window.

Example 24 may include the apparatus of example 21 and/or some other example herein, wherein to determine the common availability window, the apparatus further comprises means for: determining a minimum length of the common availability window; and determining the common end time based on the minimum length of the common availability window.

Example 25 may include the apparatus of example 21 and/or some other example herein, wherein the first LMR and the second LMR are exchanged during a first measurement sequence, and wherein the apparatus further comprises means for: determining an interval between the first measurement sequence and a second measurement sequence, wherein the interval is within the common availability window.

Example 26 may include the apparatus of example 21 and/or some other example herein, wherein an indication of the common availability window is exchanged during a negotiation phase between the initiating device and the responding device.

Example 27 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 28 may include an apparatus comprising logic, modules, and/or circuitry to perform one or more elements of a method described in or related to any of examples 1-26, or any other method or process described herein.

Example 29 may include a method, technique, or process as described in or related to any of examples 1-26, or portions or parts thereof.

Example 30 may include an apparatus comprising: one or more processors and one or more computer readable media comprising instructions that, when executed by the one or more processors, cause the one or more processors to perform the method, techniques, or process as described in or related to any of examples 1-26, or portions thereof.

Example 31 may include a method of communicating in a wireless network as shown and described herein.

Example 32 may include a system for providing wireless communication as shown and described herein.

Example 33 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A responding device, the responding device comprising processing circuitry coupled to storage, the processing circuitry configured to:
   determine a first location measurement report (LMR), wherein the first LMR comprises a first feedback type of an initiating device;
   determine a second LMR, wherein the second LMR comprises a second feedback type of the responding device;
   determine a common availability window, defined by a common start time and a common end time, for an exchange of a first LMR and a second LMR, wherein the common availability window is based on the first feedback type and on the second feedback type;
   send the first LMR to the initiating device during the common availability window; and
   identify the second LMR received from the initiating device during the common availability window.

2. The responding device of claim 1, wherein the processing circuitry is further configured to:
   determine that the first LMR feedback type is delayed feedback;
   identify an indication of a first availability window of the initiating device received from the initiating device, wherein the first availability window is defined by a first start time and a first end time;
   determine that the second LMR feedback type is delayed feedback; and
   determine a second availability window of the responding device, wherein the second availability window is defined by a second start time and a second end time.

3. The responding device of claim 2, wherein the common availability window is determined based on the first availability window and on the second availability window.

4. The responding device of claim 1, wherein to determine the common availability window, the processing circuitry is further configured to:
   determine a minimum length of the common availability window; and
   determine the common end time based on the minimum length of the common availability window.

5. The responding device of claim 1, wherein the first LMR and the second LMR are exchanged during a first measurement sequence, and wherein the processing circuitry is further configured to:

identify an indication of an interval between the first measurement sequence and a second measurement sequence received from the initiating device, wherein the interval is within the common availability window.

6. The responding device of claim 1, wherein an indication of the common availability window is exchanged during a negotiation phase between the initiating device and the responding device.

7. The responding device of claim 2, wherein the indication of the first availability window is exchanged during a negotiation phase between the initiating device and the responding device.

8. The responding device of claim 1, wherein the common availability window is determined based on information included in an indication of the first LMR feedback type and an indication of the second LMR feedback type.

9. The responding device of claim 1, further comprising a transceiver configured to transmit and receive wireless signals.

10. The responding device of claim 9, further comprising an antenna coupled to the transceiver.

11. A non-transitory computer-readable medium storing computer-executable instructions which when executed by one or more processors of a responding device result in performing operations comprising:
determining a first location measurement report (LMR), wherein the first LMR comprises a first feedback type of an initiating device;
determining a second LMR, wherein the second LMR comprises a second feedback type of the responding device;
determining a common availability window, defined by a common start time and a common end time, for an exchange of a first LMR and a second LMR, wherein the common availability window is based on the first feedback type and on the second feedback type;
sending the first LMR to the initiating device during the common availability window; and
identifying the second LMR received from the initiating device during the common availability window.

12. The non-transitory computer-readable medium of claim 11, wherein the operations further comprise:
determining that the first LMR feedback type is delayed feedback;
identifying an indication of a first availability window of the initiating device received from the initiating device, wherein the first availability window is defined by a first start time and a first end time;
determining that the second LMR feedback type is delayed feedback; and
determining a second availability window of the responding device, wherein the second availability window is defined by a second start time and a second end time.

13. The non-transitory computer-readable medium of claim 12, wherein the common availability window is determined based on the first availability window and on the second availability window.

14. The non-transitory computer-readable medium of claim 11, wherein to determine the common availability window, the operations further comprise:
determining a minimum length of the common availability window; and
determining the common end time based on the minimum length of the common availability window.

15. The non-transitory computer-readable medium of claim 11, wherein the first LMR and the second LMR are exchanged during a first measurement sequence, and wherein the operations further comprise:
identifying an indication of an interval between the first measurement sequence and a second measurement sequence received from the initiating device, wherein the interval is within the common availability window.

16. The non-transitory computer-readable medium of claim 11, wherein an indication of the common availability window is exchanged during a negotiation phase between the initiating device and the responding device.

17. A method comprising:
determining, by one or more processors of a responding device, a first location measurement report (LMR), wherein the first LMR comprises a first feedback type of an initiating device;
determining, by the one or more processors, a second LMR, wherein the second LMR comprises a second feedback type of the responding device;
determining, by the one or more processors, a common availability window, defined by a common start time and a common end time, for an exchange of a first LMR and a second LMR, wherein the common availability window is based on the first feedback type and on the second feedback type;
sending, by the one or more processors, the first LMR to the initiating device during the common availability window; and
identifying, by the one or more processors, the second LMR received from the initiating device during the common availability window.

18. The method of claim 17, wherein the method further comprises:
determining, by the one or more processors, that the first LMR feedback type is delayed feedback;
identifying, by the one or more processors, an indication of a first availability window of the initiating device received from the initiating device, wherein the first availability window is defined by a first start time and a first end time;
determining, by the one or more processors, that the second LMR feedback type is delayed feedback; and
determining, by the one or more processors, a second availability window of the responding device, wherein the second availability window is defined by a second start time and a second end time.

19. The method of claim 18, wherein the common availability window is determined based on the first availability window and on the second availability window.

20. The method of claim 17, wherein the common start time is defined by the later time of the first start time and the second start time, and wherein the common end time is defined by the later time of the first end time and the second end time.

* * * * *